(12) United States Patent
Fujishima et al.

(10) Patent No.: US 12,196,947 B2
(45) Date of Patent: Jan. 14, 2025

(54) OPERATING DEVICE, LIGHT DEFLECTOR, LIGHT DEFLECTING DEVICE, DISTANCE MEASUREMENT APPARATUS, IMAGE PROJECTION APPARATUS, AND MOBILE OBJECT

(71) Applicants: Masayuki Fujishima, Kanagawa (JP); Nobunari Tsukamoto, Osaka (JP)

(72) Inventors: Masayuki Fujishima, Kanagawa (JP); Nobunari Tsukamoto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 584 days.

(21) Appl. No.: 17/452,264

(22) Filed: Oct. 26, 2021

(65) Prior Publication Data

US 2022/0155582 A1  May 19, 2022

(30) Foreign Application Priority Data

Nov. 13, 2020 (JP) .................................. 2020-189581
Sep. 1, 2021 (JP) .................................. 2021-142654

(51) Int. Cl.
*G02B 26/08* (2006.01)
*G01S 7/481* (2006.01)
*G01S 17/931* (2020.01)

(52) U.S. Cl.
CPC ........ *G02B 26/0816* (2013.01); *G01S 7/4811* (2013.01); *G01S 17/931* (2020.01)

(58) Field of Classification Search
CPC .............. G02B 26/0816; G02B 27/104; G02B 26/101; G02B 27/01; G02B 26/0858; G01S 7/4811; G01S 17/931; G01S 7/4817

See application file for complete search history.

(56) References Cited

U.S. PATENT DOCUMENTS

2017/0350759 A1    12/2017  Azumi et al.
2017/0374325 A1*   12/2017  Itoh ...................... G02B 3/0056
(Continued)

FOREIGN PATENT DOCUMENTS

JP    2019-144497    8/2019
JP    2020-101587    7/2020
(Continued)

OTHER PUBLICATIONS

U.S. Appl. No. 17/312,177, filed Nov. 1, 2019, Masayuki Fujishima, et al.

*Primary Examiner* — Joseph P Martinez
*Assistant Examiner* — Ray Alexander Dean
(74) *Attorney, Agent, or Firm* — IPUSA, PLLC

(57) ABSTRACT

An operating device includes an oscillator oscillable around an oscillation axis; a support; and a movable portion. The movable portion includes: a first connecting portion on one end, connected to the oscillator; a second connecting portion on the other end, connected to the support; and a beam extending in a direction intersecting the oscillation axis. At least one of the first connecting portion and the second connecting portion includes: a first extending portion extending along the oscillation axis; and a first thick portion extending along the oscillation axis and having a thickness greater than a thickness of another portion other than the first thick portion in the at least one of the first connecting portion and the second connecting portion, at least a part of the first thick portion included in the first extending portion.

13 Claims, 23 Drawing Sheets

(56) References Cited

U.S. PATENT DOCUMENTS

| | | | |
|---|---|---|---|
| 2018/0215608 A1 | 8/2018 | Fujishima et al. | |
| 2018/0252578 A1* | 9/2018 | Suzuki | G01J 3/30 |
| 2018/0267293 A1 | 9/2018 | Fujishima et al. | |
| 2019/0265462 A1* | 8/2019 | Yamada | G02B 26/10 |
| 2020/0400940 A1 | 12/2020 | Fujishima et al. | |
| 2021/0109342 A1 | 4/2021 | Fujishima et al. | |

FOREIGN PATENT DOCUMENTS

| | | | | |
|---|---|---|---|---|
| JP | 2020101587 A | * | 7/2020 | B81B 3/0037 |
| WO | WO-2017018312 A1 | * | 2/2017 | B81B 3/0045 |

\* cited by examiner

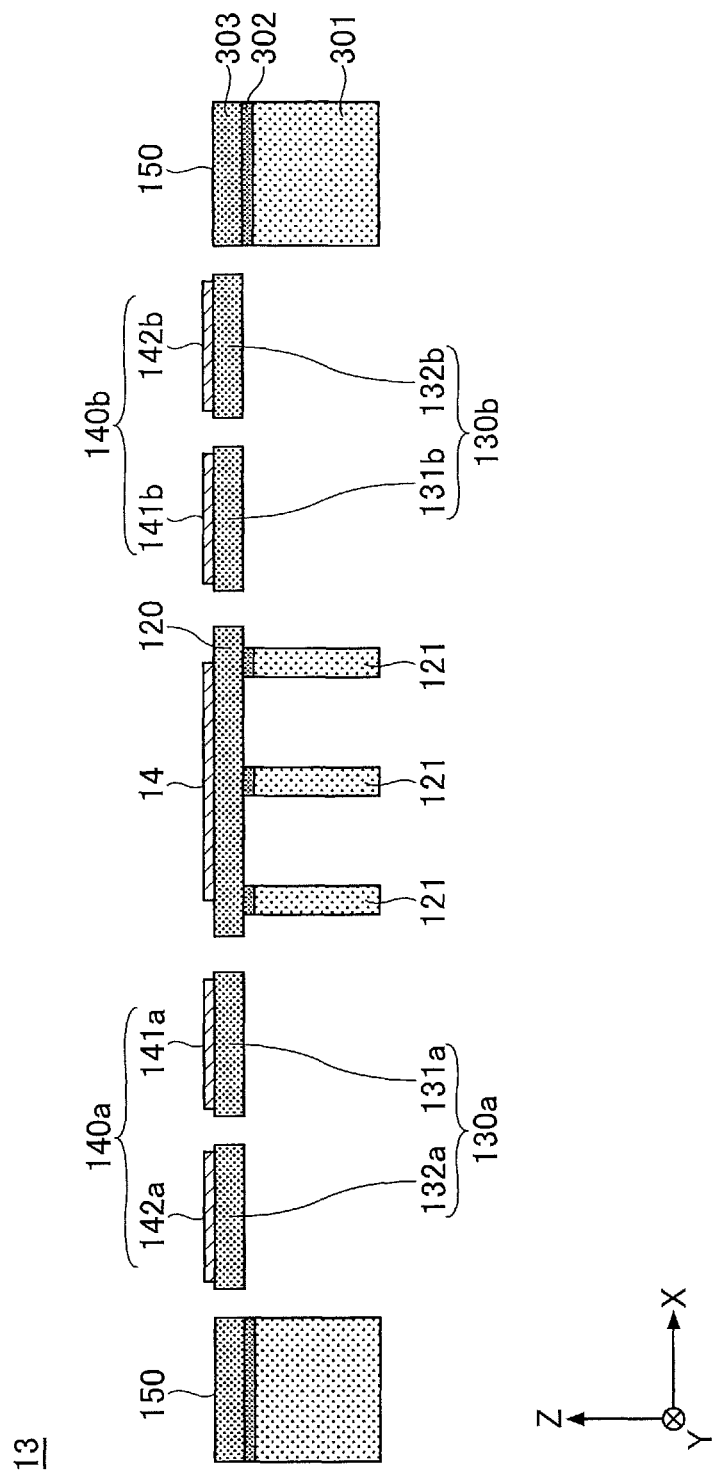

COMPARATIVE EXAMPLE

COMPARATIVE EXAMPLE

COMPARATIVE EXAMPLE

COMPARATIVE EXAMPLE

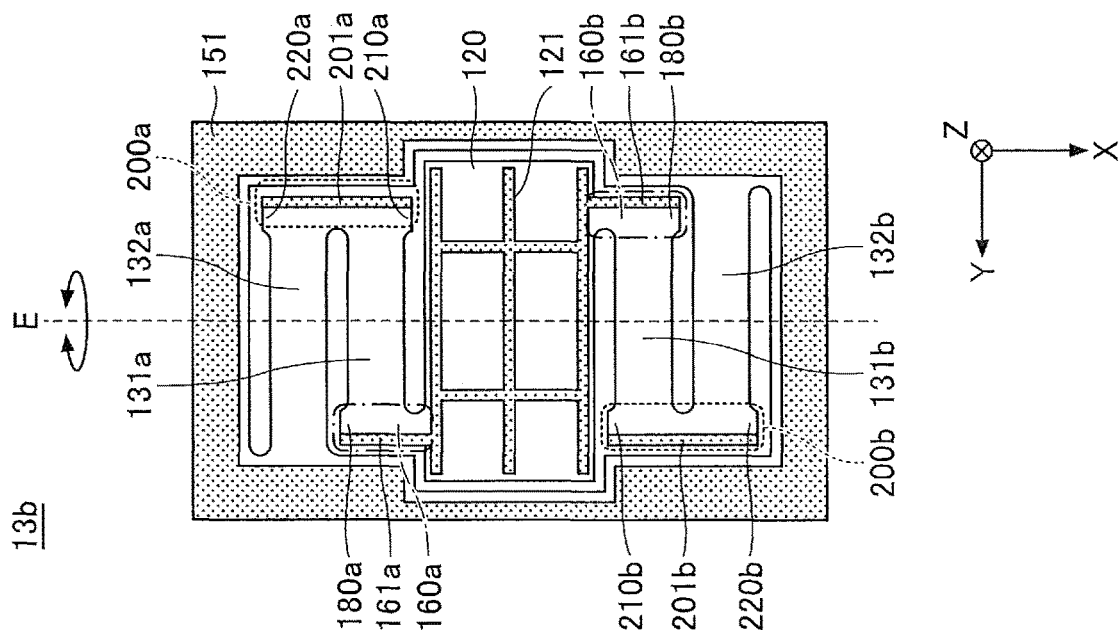
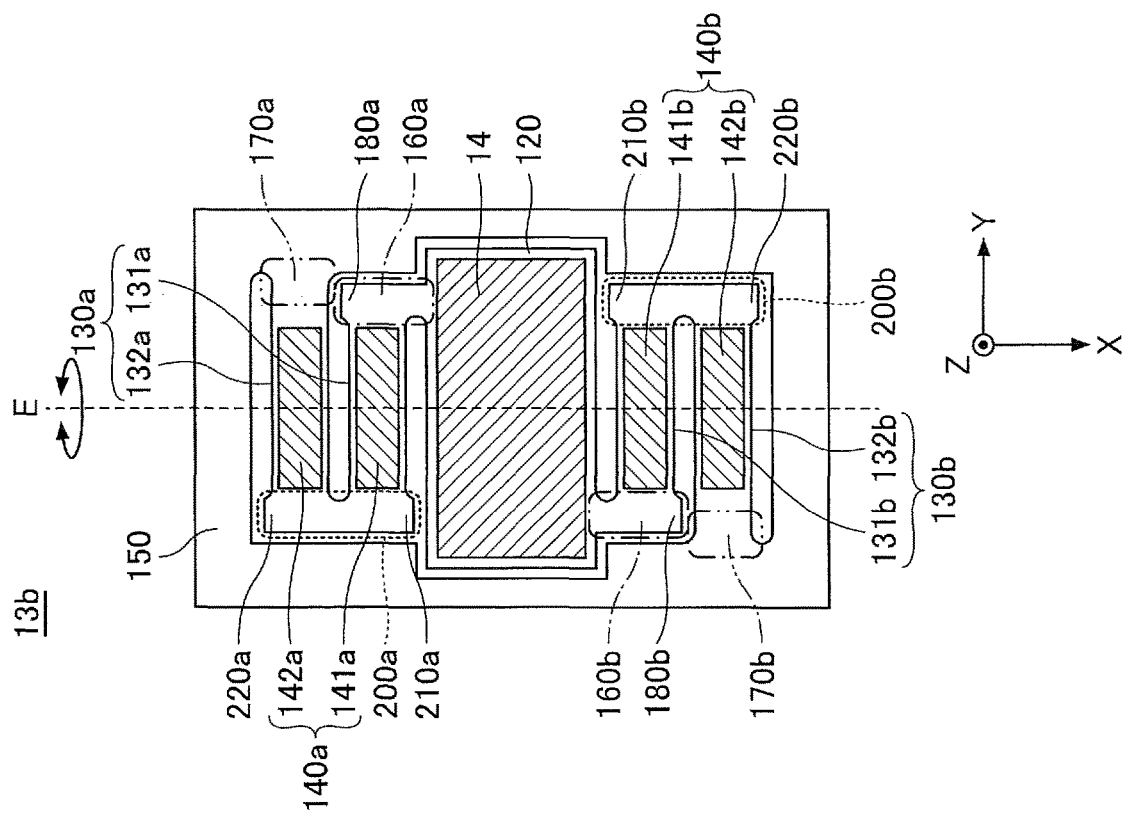

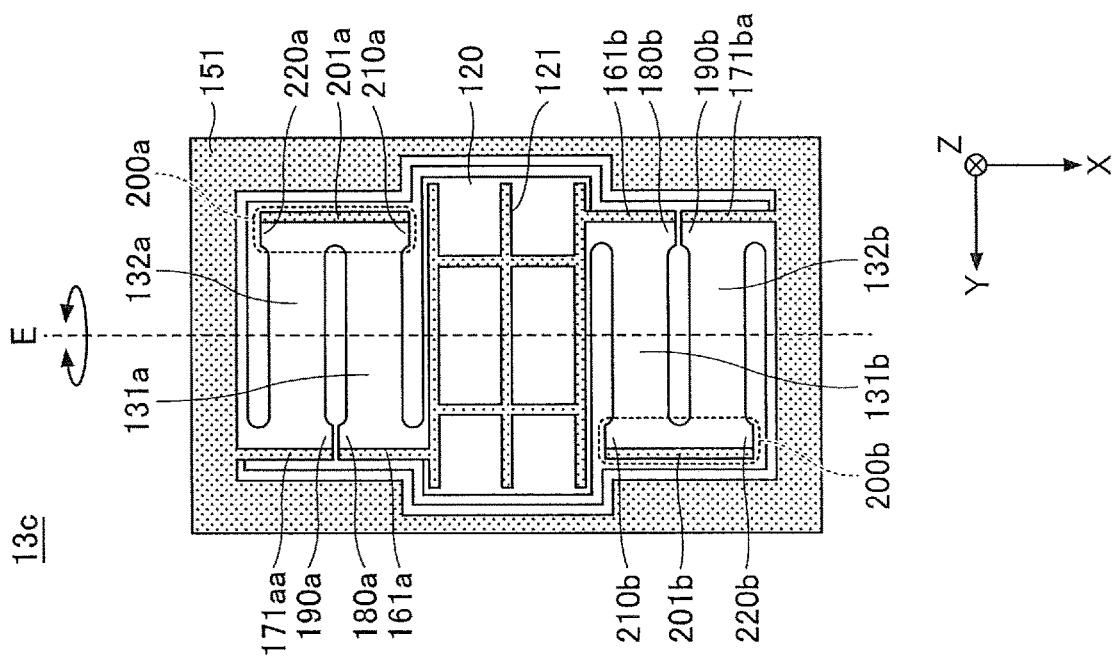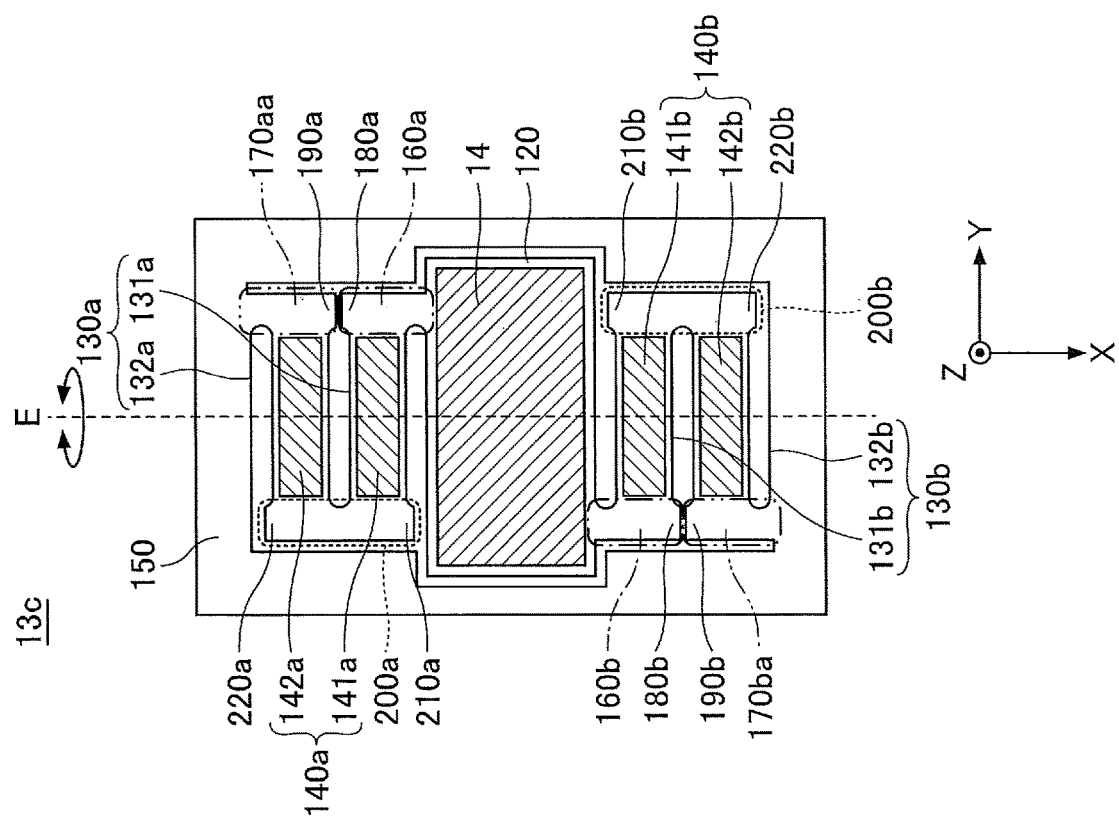

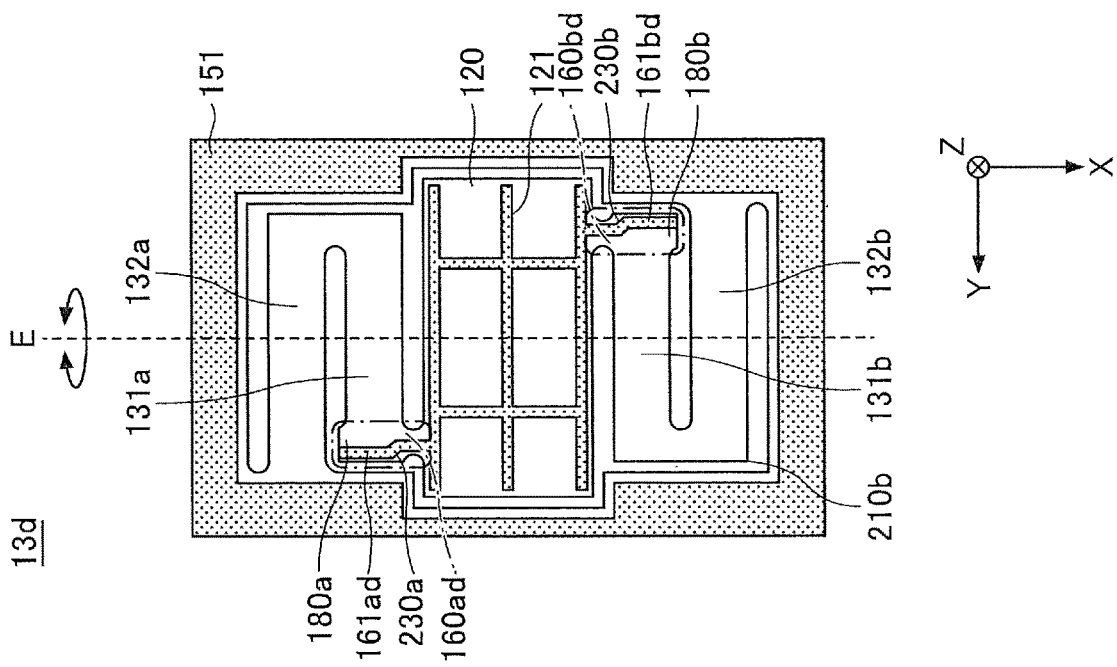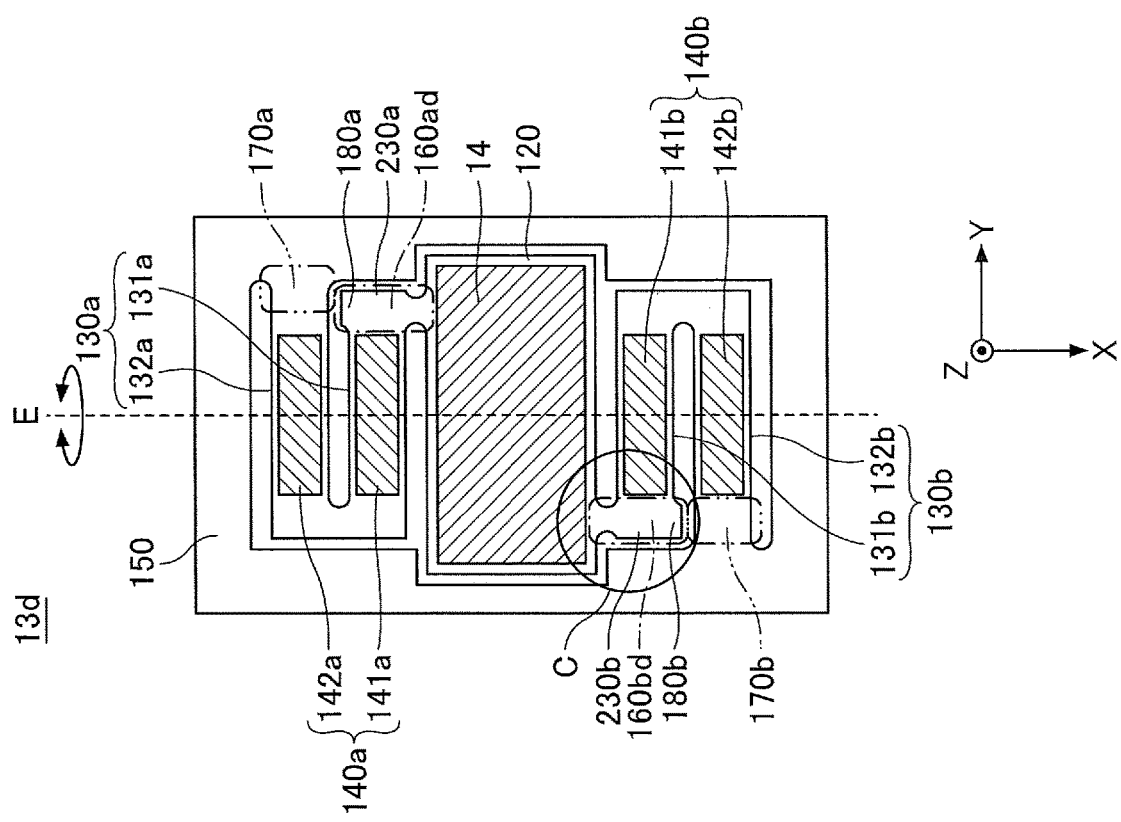

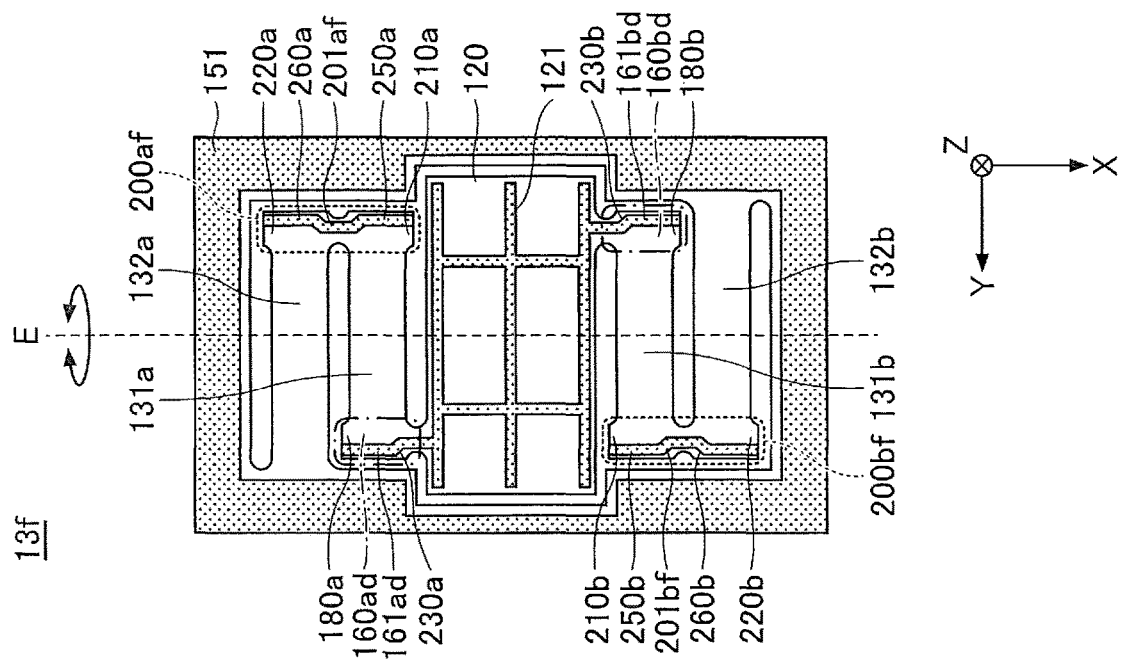
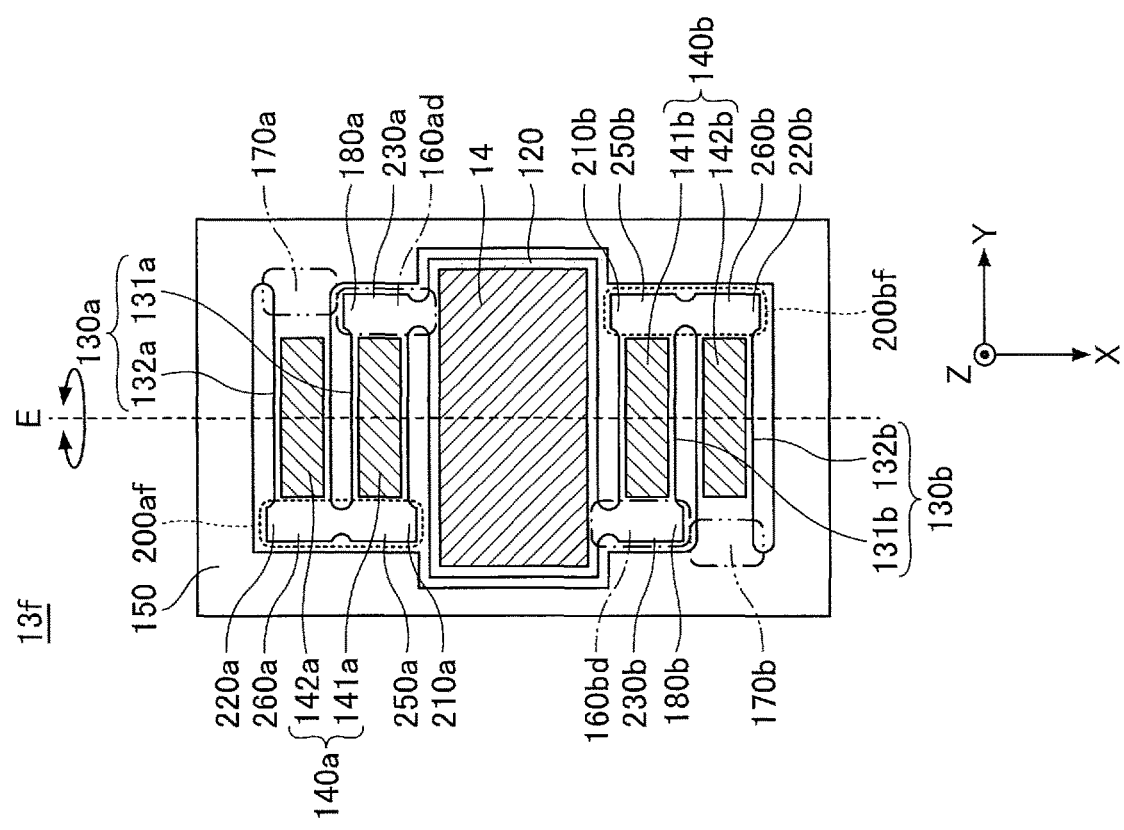

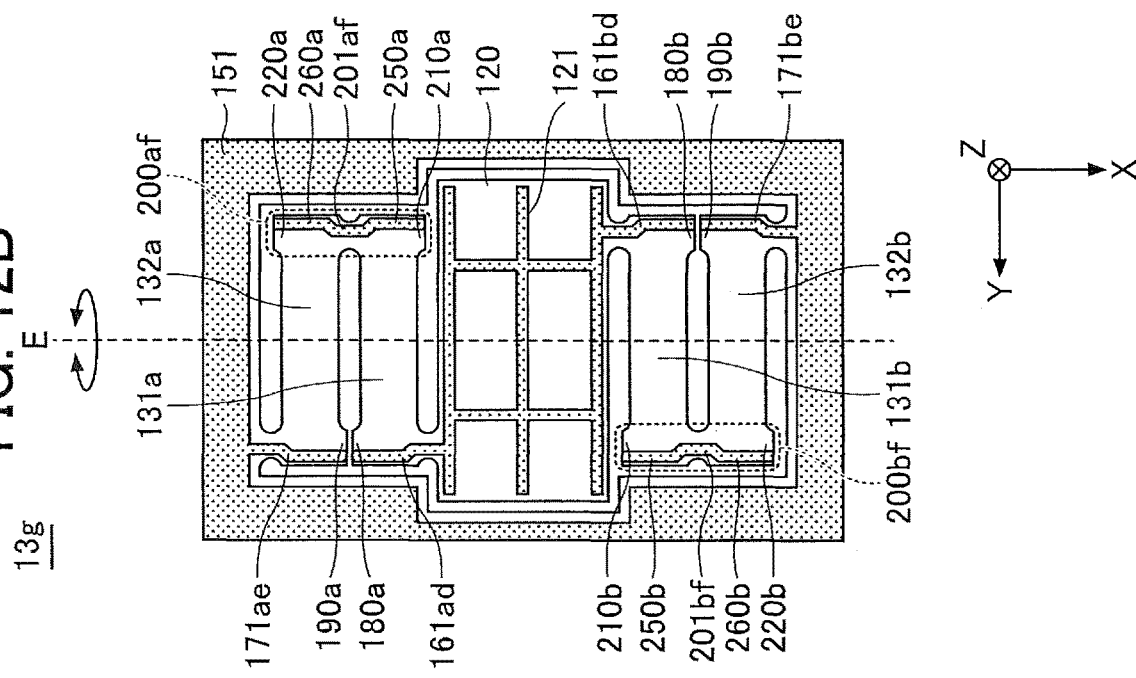
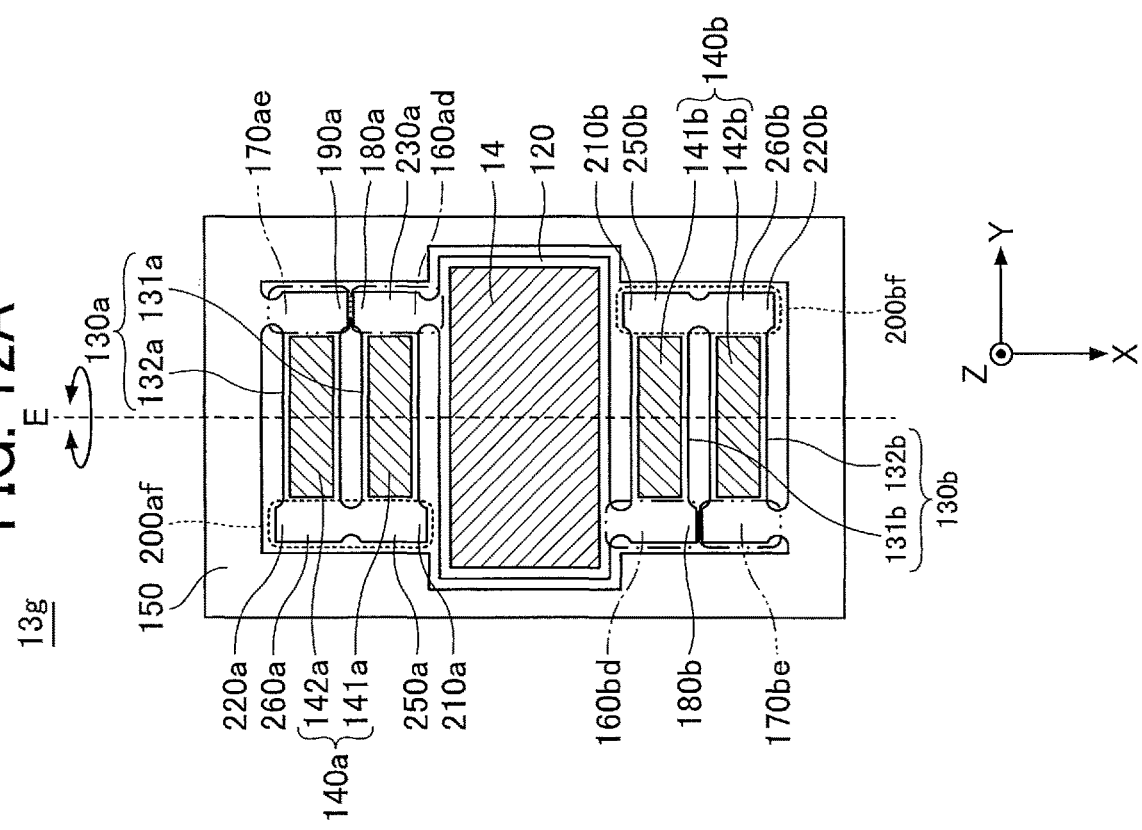

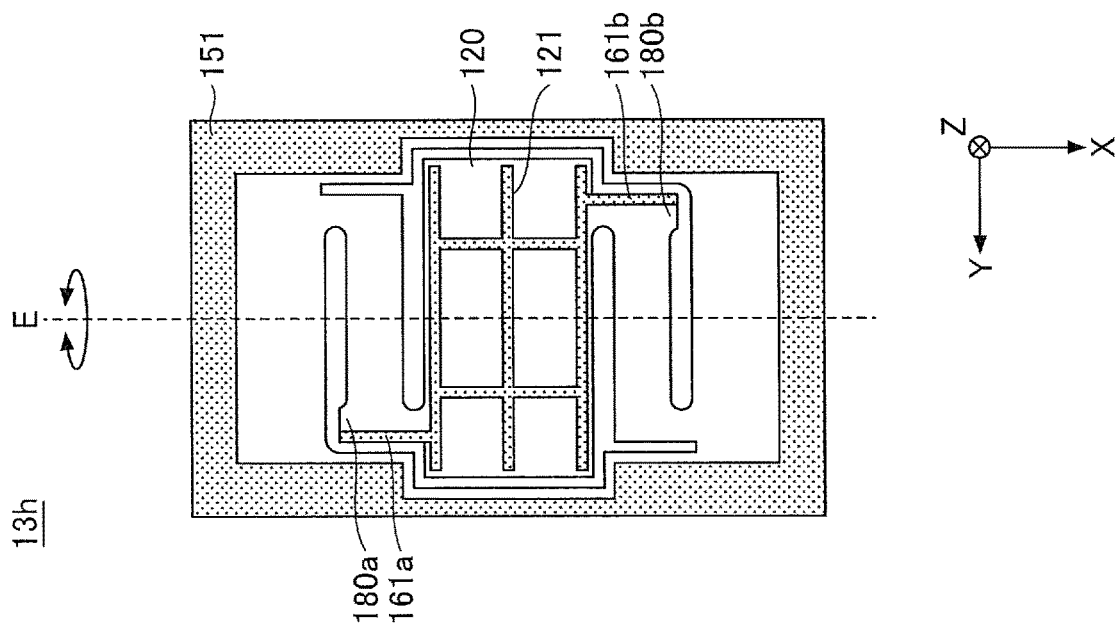
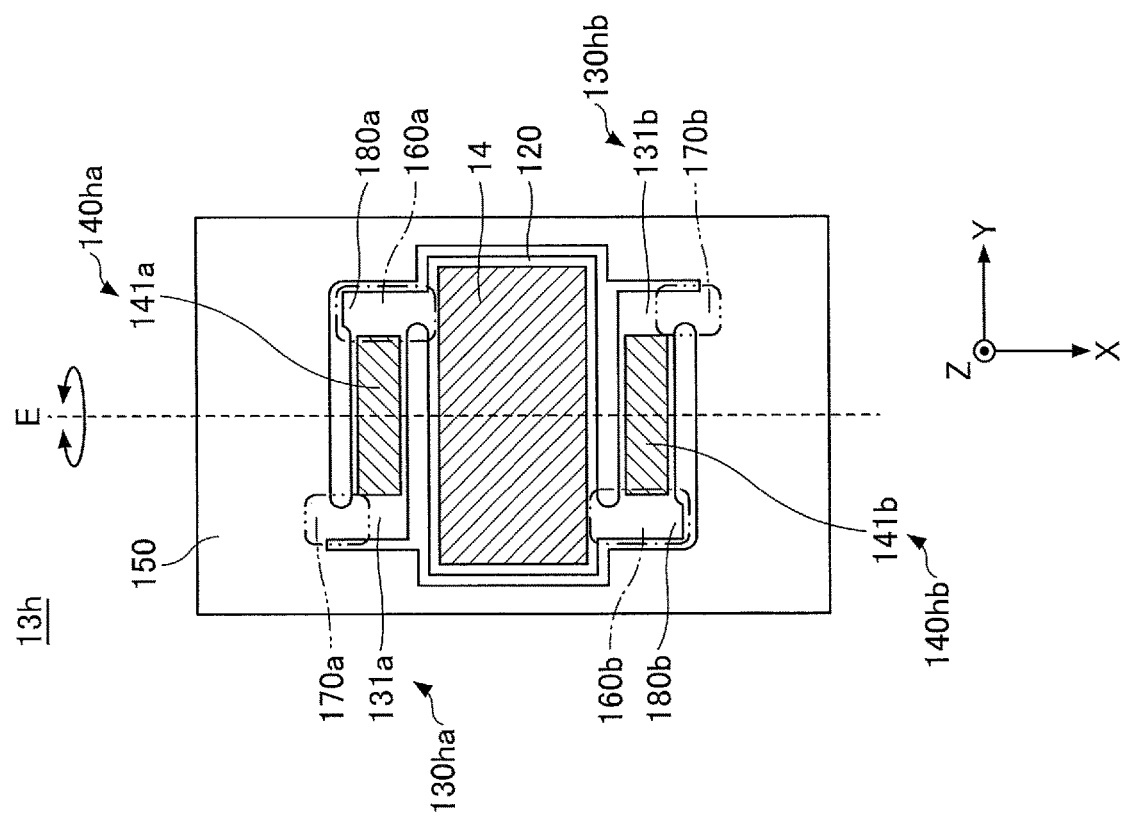

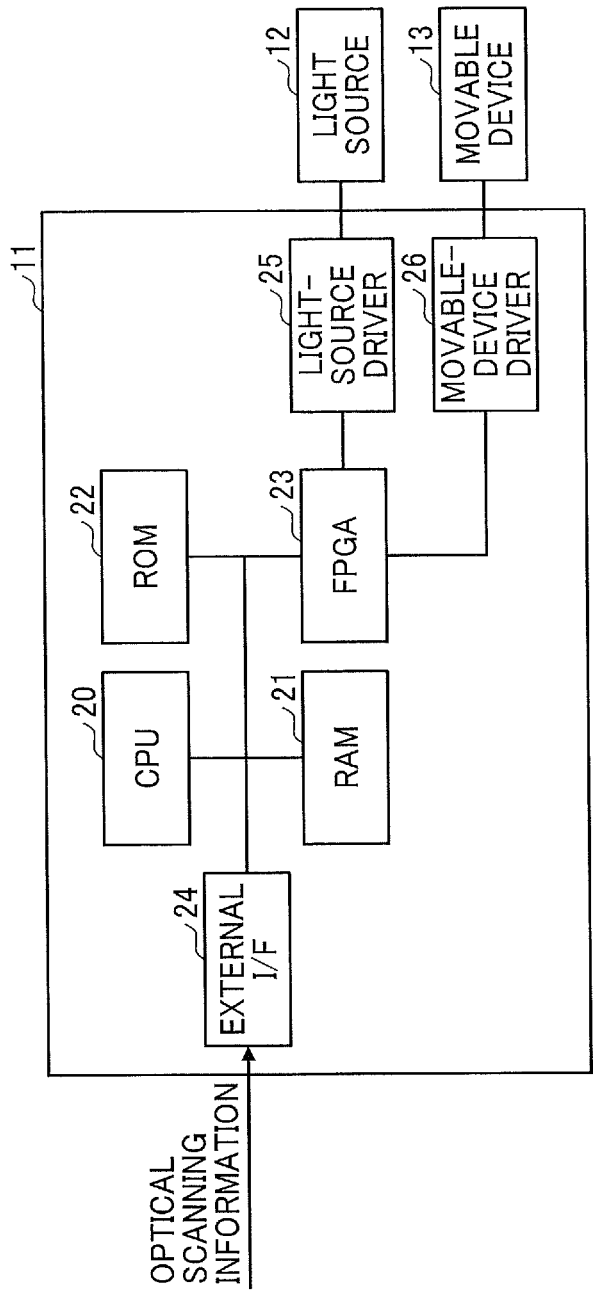

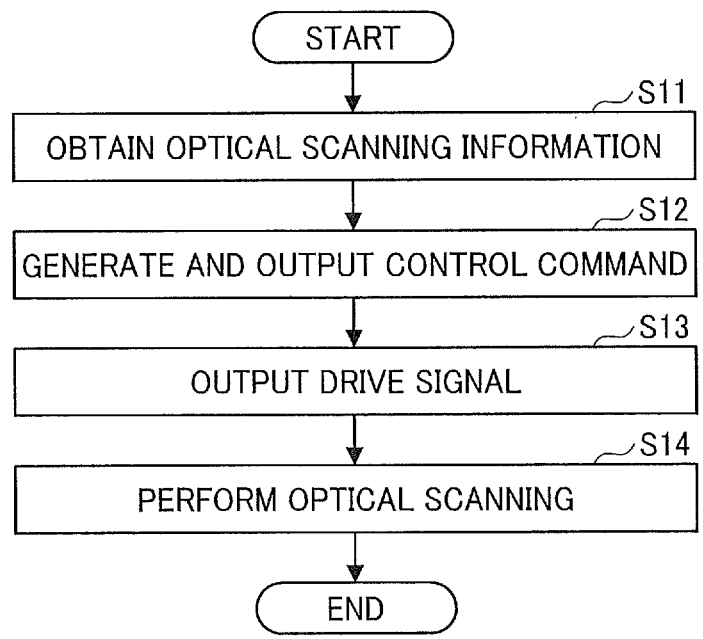
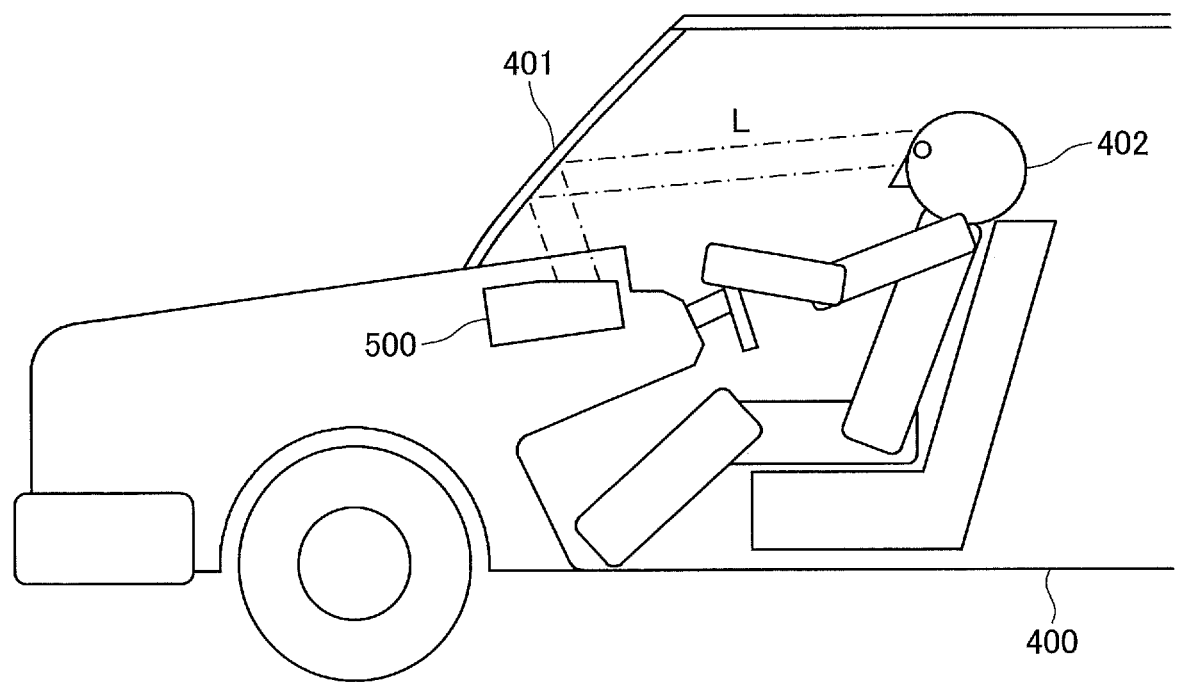

OPERATING DEVICE, LIGHT DEFLECTOR, LIGHT DEFLECTING DEVICE, DISTANCE MEASUREMENT APPARATUS, IMAGE PROJECTION APPARATUS, AND MOBILE OBJECT

CROSS-REFERENCE TO RELATED APPLICATIONS

This patent application is based on and claims priority pursuant to 35 U.S.C. § 119(a) to Japanese Patent Application No. 2020-189581, filed on Nov. 13, 2020 and Japanese Patent Application No. 2021-142654, filed on Sep. 1, 2021, in the Japan Patent Office, the entire disclosure of which is hereby incorporated by reference herein.

BACKGROUND

Technical Field

The present disclosure relates to an operating device, a light deflector, a light deflecting device, a distance measurement apparatus, an image projection apparatus, and a mobile object.

Related Art

In recent years, with the development of micromachining technology to which semiconductor manufacturing technology is applied, the development of MEMS (Micro Electro Mechanical Systems) devices manufactured by micromachining silicon or glass has advanced. As one of such MEMS devices, there is known an operating device in which an oscillator including a reflecting surface oscillates around a given oscillation axis.

SUMMARY

An operating device includes an oscillator oscillable around an oscillation axis; a support; and a movable portion. The movable portion includes: a first connecting portion on one end, connected to the oscillator; a second connecting portion on the other end, connected to the support; and a beam extending in a direction intersecting the oscillation axis. At least one of the first connecting portion and the second connecting portion includes: a first extending portion extending along the oscillation axis; and a first thick portion extending along the oscillation axis and having a thickness greater than a thickness of another portion other than the first thick portion in the at least one of the first connecting portion and the second connecting portion, at least a part of the first thick portion included in the first extending portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a cross-sectional view taken along an oscillation axis in FIGS. 1A and 1B;

FIGS. 6A and 6B are illustrations of a configuration of a movable device according to a second embodiment;

FIGS. 7A and 7B are illustrations of a configuration of a movable device according to a variation of the second embodiment;

FIGS. 8A and 8B are illustrations of a configuration of a movable device according to a third embodiment;

FIGS. 11A and 11B are illustrations of a configuration of a movable device according to a fourth embodiment;

FIGS. 12A and 12B are illustrations of a configuration of a movable device according to a variation of the fourth embodiment;

FIGS. 13A and 13B are illustrations of a configuration of a movable device according to a fifth embodiment;

FIG. 15 is a hardware block diagram of the optical scanning system in FIG. 14;

FIG. 16 is a functional block diagram of a control device according to an embodiment of the present disclosure;

FIG. 17 is a flowchart of processing involved in the optical scanning system, according to an embodiment of the present disclosure;

FIG. 18 is a schematic view of an example of a vehicle equipped with a head-up display device (HUD);

Figure 1C:
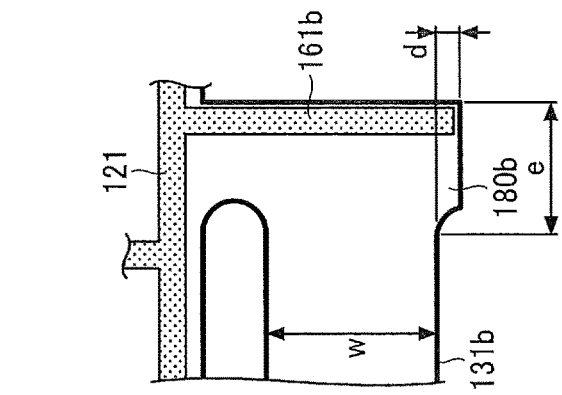
FIGS. 1A, 1B, and 1C are illustrations of a configuration of a movable device according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As used herein, the term "connected/coupled" includes both direct connections and connections in which there are one or more intermediate connecting elements.

Embodiments of the present disclosure prevent breakage of an operation device.

Embodiments of the present disclosure are described referring to the drawings. Like reference signs are applied to identical or corresponding components throughout the drawings and redundant description thereof may be omitted. The embodiments to be described below exemplify an operating device and a light deflector, which implement the technical concepts of the present disclosure. However, no limitation is intended thereby.

Unless otherwise specified, shapes, dimensions, and materials of components, relative arrangements thereof, and values described below are not intended to limit the scope of the present invention but are intended to exemplify the scope of the present invention.

The relative positions of the elements illustrated in the drawings are exaggerated for purpose of clear illustration.

In the drawings described below, an X-direction is parallel to an oscillation axis E of a movable portion in an operating device, a Y-direction is orthogonal to the X-direction, and a Z-direction is a height direction orthogonal to each of the X-direction and the Y-direction. However, these directions do not limit the orientation of the operating device, and the operating device is oriented in any desired direction.

First Embodiment

Figure 1B:
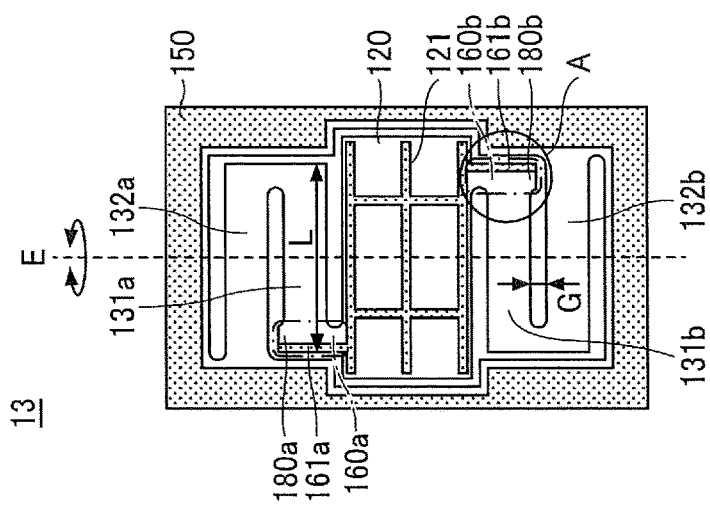
Figure 1A:
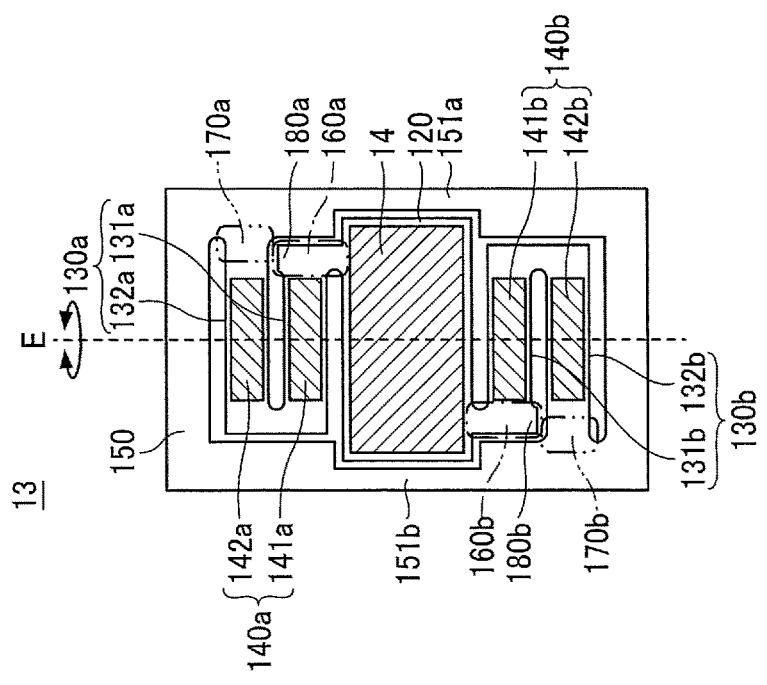

First, the configuration of a movable device 13 according to the first embodiment will be described in detail with reference to FIGS. 1A, 1B, and 1C. FIGS. 1A, 1B, and 1C are illustrations of an exemplary configuration of the movable device 13 with a both-side-support structure that uniaxially deflects light. FIG. 1A is a plan view of the movable device 13. FIG. 1B is a rear view of the movable device 13. FIG. 1C is a partially enlarged view of an area A in FIG. 1B.

As illustrated in FIGS. 1A, 1B, and 1C, the movable device 13 includes a reflector 120, movable portions 130a and 130b, actuators 140a and 140b, and a support 150. In the present embodiment, the reflector 120 is rectangular and has a rectangular reflecting surface 14 on the +Z-surface of the reflector 120. The reflecting surface reflects incident light. The reflector 120 is not limited to a rectangular shape, and may have a shape other than the rectangular shape. Examples of the shape other than the rectangular shape include a circle and an elliptical shape. The movable device 13 is an example of an operating device in which the reflector 120 having the reflecting surface 14 oscillates about the oscillation axis E, and is an example of a light deflector including the operating device. The reflector 120 is an example of an oscillator that oscillates.

The movable portion 130a has one end connected to the reflector 120 through a first connecting portion 160a, and the movable portion 130b has one end connected to the reflector 120 through the first connecting portion 160b. In the movable device 13, the movable portions 130a and 130b are arranged facing each other between which the reflector 120 is disposed, to allow the reflector 120 to oscillate. In the present embodiment, a pair of movable portions are used. Alternatively, only one movable portion may be used, and still alternatively, multiple movable portions may be used as in a vector scan method.

The movable portion 130a has the other end connected to the support 150 through a second connecting portion 170a, and the movable portion 130b has the other end connected to the support 150 through a second connecting portion 170b. This arrangement allows the support 150 to be a frame supporting the movable portion 130a and the movable portion 130b. Notably, in some examples, the support 150 may have a structure in which light reflected by the reflector 120 passes through or is transmitted through a portion of the support 150 in a direction intersecting the oscillation axis. For example, the support 150 has an open that allows light reflected by the reflector 120 to pass therethrough in the direction intersecting the oscillation axis. For another example, a part of the support 150 is made of permeable material, such as glass, that transmits light reflected by the reflector 120 in the direction intersecting the oscillation axis. This configuration prevents the support 150 from blocking light deflected by the reflector 120 even with an increase in the oscillation angle of the reflector 120.

The actuator 140a elastically deforms the movable portion 130a, and the actuator 140b elastically deforms the movable portion 130b. This thus causes the reflector 120 to rotatably oscillate about the oscillation axis E. In the movable device 13, the movable portion 130a is on the actuator 140a, and the movable portion 130b is on the actuator 140b.

Further, in the movable device 13, at least one wire is provided in the area other than the actuator 140a on the movable portion 130a, the area other than the actuator 140b on the movable portion 130b, and on the support 150, so as to transmit a drive voltage applied to electrode terminals on the support 150 to the actuators 140a and 140b.

The movable portion 130a has two movable beams 131a and 132a arranged substantially in parallel. Each of the movable beams 131a and 132a is an example of a linear beam extending in the direction intersecting the oscillation axis E, and adjacent ends of the movable beams 131a and 132a are coupled to each other so as to form a turning structure, or a meander structure. In other words, the movable portion 130a has a meander structure in which adjacent ends of the movable beams 131a and 132a are coupled to each other to form a turning portion.

The movable beam 131a closer to the reflector 120 than the movable beam 132a is connected to the reflector 120 through the first connecting portion 160a. The movable beam 132a closer to the support 150 than the movable beam 131a is connected to the support 150 through the second connecting portion 170a.

The movable portion 130b has two movable beams 131b and 132b arranged substantially in parallel. Each of the movable beams 131b and 132b is an example of a linear beam extending in the direction intersecting the oscillation axis E, and adjacent ends of the movable beams 131b and 132b are coupled to each other so as to form a turning structure, or a meander structure. In other words, the movable portion 130b has a meander structure in which adjacent ends of the movable beams 131b and 132b are coupled to each other to form a turning portion.

The movable beam 131b closer to the reflector 120 than the movable beam 132b is connected to the reflector 120 through the first connecting portion 160b. The movable beam 132b closer to the support 150 than the movable beam 131b is connected to the support 150 through the second connecting portion 170b.

The actuator 140a includes two piezoelectric elements 141a and 142a. Each of the piezoelectric elements 141a and 142a has a rectangular shape whose longitudinal direction is the Y-direction. The movable beam 131a includes the piezoelectric element 141a on the +Z-surface of the movable beam 131a, and the movable beam 132a includes the piezoelectric element 142a on the +Z-surface of the movable beam 132a.

The actuator 140b includes two piezoelectric elements 141b and 142b. Each of the piezoelectric elements 141b and 142b has a rectangular shape whose longitudinal direction is the Y-direction. The movable beam 131b includes the piezoelectric element 141b on the +Z-surface of the movable beam 131b, and the movable beam 132b includes the piezoelectric element 142b on the +Z-surface of the movable beam 132b.

The present embodiment provides a turning structure (i.e., a meander structure) in which each of the movable portions 130a and 130b includes two movable beams. However, this is only one example. However, no limitation is intended thereby. Each of the movable portions 130a and 130b may include one movable beam or three or more movable beams. In the case of one movable beam included in each of the movable portions 130a and 130b, the movable device 13 does not have a meander structure. The number of the actuators 140a and 140b may be equal to the number of the movable beams. Alternatively, multiple actuators may be provided in one movable beam. Still alternatively, a movable beam without an actuator may be provided. Further, a piezoelectric element that detects, for example, an oscillation angle and serves not as an actuator may be provided in a movable beam separately from another piezoelectric element serving as an actuator.

The first connecting portion 160a is a portion of the movable portion 130a, which is connected to the reflector 120. The first connecting portion 160a includes an extending portion 180a extending from the movable beam 131a in the −X-direction, or along the oscillation axis E. The extending portion 180a is at the end of the first connecting portion 160a in the X-direction, which is farther from the reflector 120 than the other end of the first connecting portion 160a, and extends from the movable beam 131a in the −X-direction. The extending portion 180a is an example of an extending portion that extends along the axis (i.e., the oscillation axis E).

The first connecting portion 160a indicated by a dashed-dotted line in FIG. 1A ranges in the X-direction from the portion of the movable beam 131a in the X-direction, which is closest to and connected to the reflector 120, to the −X-end of the extending portion 180a at the end of the movable beam 131a in the X-direction, which is farther from the reflector 120 than the other end of the movable beam 131a in the X-direction. Further, the first connecting portion 160a has substantially the same width in the Y-direction as the width of the portion of the movable beam 131a, which is connected to the reflector 120 in the Y-direction.

The first connecting portion 160b is a portion of the movable portion 130b, which is connected to the reflector 120. The first connecting portion 160b includes an extending portion 180b extending from the movable beam 131b in the +X-direction, or along the oscillation axis E. The extending portion 180b is at the end of the first connecting portion 160b in the X-direction, which is farther from the reflector 120 than the other end of the first connecting portion 160b, and extends from the movable beam 131b in the +X-direction. The extending portion 180b is an example of an extending portion that extends along the axis (e.g., the oscillation axis E).

The first connecting portion 160b indicated by a dashed-dotted line in FIG. 1A ranges in the X-direction from the portion of the movable beam 131b, which is closest to the reflector 120 and connected to the reflector 120, to the +X-end of the extending portion 180b at the end of the movable beam 131b, which is farther from the reflector 120 than the other end of the movable beam 131b in the X-direction. Further, the first connecting portion 160b has substantially the same width in the Y-direction as the width of the portion of the movable beam 131b in the Y-direction, which is connected to the reflector 120.

As illustrated in FIG. 1B, the first connecting portion 160a includes a thick portion 161a as a first thick portion extending along the oscillation axis E, on the −Z-surface of the movable beam 131a. The thick portion 161a is thicker than the other portions of the first connecting portion 160a. In other words, the thick portion 161a has a thickness larger than those of the other portions other than the thick portion 161a in the first connecting portion 160a. Further, a part of the thick portion 161a extending in the X-direction is included in the extending portion 180a in the X-direction. The thick portion 161a, which is formed to be thick, prevents or reduces distortion of the first connecting portion 160a, and thus prevents an oscillation failure of the reflector 120 due to a resonance frequency drift, which is caused by the distortion of the first connecting portion 160a.

Similarly, the first connecting portion 160b includes a thick portion 161b as a first thick portion extending along the oscillation axis E on the −Z-surface of the movable beam 131b. The thick portion 161b is thicker than the other portions of the first connecting portion 160b. In other words, the thick portion 161b has a thickness larger than those of the other portions other than the thick portion 161b in the first connecting portion 160b. Further, a part of the thick portion 161b extending in the X-direction is included in the extending portion 180b in the X-direction. The thick portion 161b, which is formed to be thick, prevents or reduces distortion of the first connecting portion 160b, and thus prevents an oscillation failure of the reflector 120 due to a resonance frequency drift, which is caused by the distortion of the first connecting portion 160b.

A thick portion 121 is thicker than the other portion of the reflector 120. In other words, the thick portion 121 has a thickness larger than those of the other portions other than the thick portion 121 in the reflector 120. The thick portion 121, which is formed to be thick, prevents or reduces distortion of the reflector 120 and thus stabilizes light deflection of the reflector 120. The thick portion 121 is an example of a thick portion for an oscillator.

The thick portions 161a and 161b each have a thickness substantially equal to the thickness of the thick portion 121 on the −Z-surface of the reflector 120. The thick portions 161a and 161b each are connected to the thick portion 121 on the −Z-surface of the reflector 120.

In FIG. 1C, the extending portion 180b has the length d in the X-direction, the length e in the Y-direction, and substantially the same thickness as the thickness of the movable beam 131b. The extending portion 180a also has the length d in the X-direction, the length e in the Y-direction, and the substantially same thickness as the thickness of the movable beam 131a. The length w in FIG. 1C is the width of the movable beam 131b in the X-direction.

The second connecting portion 170a in FIG. 1A is a portion of the movable portion 130a, which is connected to the support 150. The support 150 has a support frame portion 151a as a first support frame portion that extends in the X-direction, or along the oscillation axis E. The movable portion 130a is connected to the support frame portion 151a with the second connecting portion 170a between the movable portion 130a and the support frame portion 151a.

The second connecting portion 170a indicated by dot-dot-dash line in FIG. 1A has substantially the same width as the width of a portion of the movable beam 132a in the X-direction, which is connected to the support 150. Notably, as the second connecting portion 170a according to the present embodiment is without any elements such as the thick portion 161a and the extending portion 180a of the first connecting portion 160a, no restriction is imposed on the second connecting portion 170a in the Y-direction.

The second connecting portion 170b is a portion of the movable portion 130b, which is connected to the support 150. The support 150 has a support frame portion 151b as a first support frame portion that extends in the X-direction, or along the oscillation axis E. The movable portion 130b is connected to the support frame portion 151b with the second connecting portion 170b between the movable portion 130b and the support frame portion 151b.

The second connecting portion 170b indicated by dot-dot-dash line in FIG. 1A has substantially the same width as the width of a portion of the movable beam 132b in the X-direction, which is connected to the support 150. Notably, as the second connecting portion 170b according to the present embodiment is without any elements such as the thick portion 161b and the extending portion 180b of the first connecting portion 160b, no restriction is imposed on the second connecting portion 170b in the Y-direction.

FIG. 2 is a cross-sectional view taken along the oscillation axis E in FIGS. 1A and 1B. The movable device 13 includes the reflecting surface 14, and the actuators 140a and 140b on one silicon on insulator (SOI) substrate that has undergone, for example, an etching process.

The SOI substrate includes a silicon supporting layer 301 containing single crystal silicon (Si), a silicon oxide layer 302 on the +Z-surface of the silicon supporting layer 301, a silicon active layer 303 containing single crystal Si on the silicon oxide layer 302. The silicon oxide layer 302 is referred to also as a buried oxide (BOX) layer.

The silicon active layer 303 has a smaller thickness in the Z-direction than in the X-direction or the Y-direction. Such a smaller thickness of the silicon active layer 303 in the Z-direction allows a lower Z-directional rigidity of a member including only the silicon active layer 303, which is formed by removing the silicon supporting layer 301 and the silicon oxide layer 302 from the SOI substrate by etching.

The support 150, which includes the silicon support layer 301, the silicon oxide layer 302, and the silicon active layer 303, has higher rigidity than such a member including only the silicon active layer 303.

The reflector 120 includes the silicon active layer 303. The reflector 120 includes the reflecting surface 14 on the +Z-surface of the reflector 120 by forming a thin film including aluminum, gold and silver coatings and a derivative multilayer film. The reflector 120 is provided with the thick portion 121 for reinforcement on its −Z-surface (i.e., the back surface of the reflector 120). The thick portion 121 is formed by patterning the silicon supporting layer 301 and the silicon oxide layer 302 by etching.

Similarly with the thick portion 121, the thick portions 161a and 161b in FIGS. 1A, 1B, and 1C is also formed by patterning the silicon supporting layer 301 and the silicon oxide layer 302 by etching.

The movable portions 130a and 130b are formed by patterning the silicon active layer 303 by etching. The movable portions 130a and 130b, which include only the silicon active layer 303, have elasticity and low rigidity.

The piezoelectric elements 141a, 142a, 141b, and 142b each are formed by laminating a lower electrode, a piezoelectric portion, and an upper electrode. Each of the upper electrode and the lower electrode contains gold (Au) or platinum (Pt). For example, the piezoelectric portion contains lead zirconate titanate (PZT) as a piezoelectric material. The piezoelectric portion, when a positive or negative voltage in the polarization direction is applied thereto, is deformed (for example, expanded or contracted) in proportion to the potential of the applied voltage and exhibits inverse piezoelectric effect.

The movable portions 130a and 130b are elastically deformed by the deformation of the piezoelectric elements 141a, 142a, 141b, and 142b.

The movable device 13 formed as described above operates by applying a drive voltage to the actuators 140a and 140b through the electrode terminals. The drive voltage is, for example, in a sinusoidal waveform and has a frequency of, for example, 600 Hz.

Specifically, the piezoelectric elements 141a and 142b are categorized as a first piezoelectric-element group, and the piezoelectric elements 141b and 142b are categorized as a second piezoelectric-element group. Drive voltages having inverted voltage levels are applied to the first piezoelectric-element group and the second piezoelectric-element group, respectively. Such application of the drive voltages having the inverted voltage levels causes the actuators 140a and 140b to expand and contract, to periodically deform the movable beams 131a and 132b in one direction and the movable beam 132a and 131b in the opposite direction of the one direction. The deformation of the movable beams 131a, 131b, 132a, and 132b causes the reflector 120 to oscillate around the oscillation axis E.

The above-described embodiment provides a piezoelectric light deflector that utilizes a driving force generated by the piezoelectric elements. However, the light deflector may be actuated by any other type of actuating method. Examples of the actuating method other than the piezoelectric method include an electrostatic method.

Next, the operation of the movable device 13 will be described.

Figure 3C:
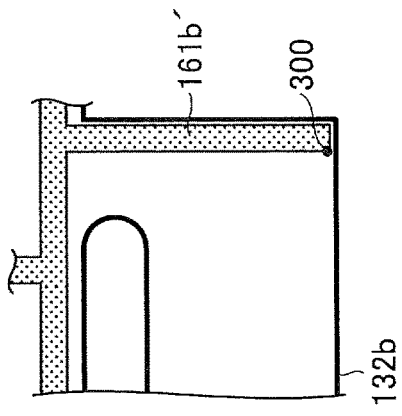
FIGS. 3A, 3B, and 3C are illustration of a configuration of a movable device according to a comparative example.
Figure 3B:
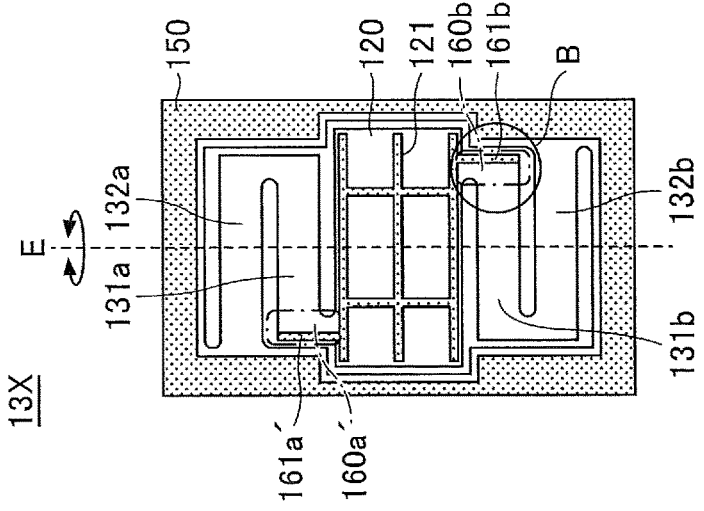
Figure 3A:
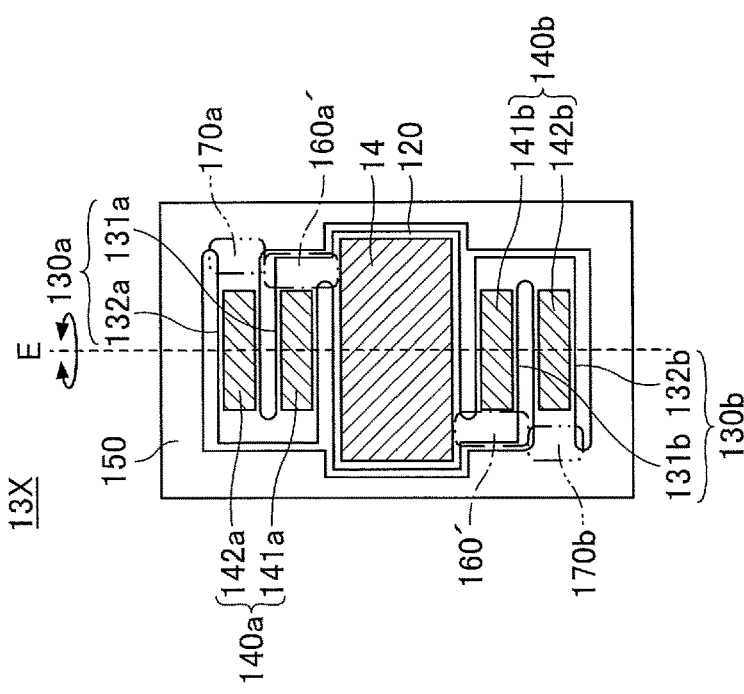

The configuration of a movable device 13X according to a comparative example with reference to FIGS. 3A, 3B, and 3C, and then, the operation of the movable device 13 is described. FIGS. 3A, 3B, and 3C are illustration of a configuration of the movable device 13X according to a comparative example. FIG. 3A is a plan view of the configuration of the movable device 13X. FIG. 3B is a rear view of the configuration of the movable device 13X. FIG. 3C is a partially enlarged view of an area B in FIG. 3B.

The movable device 13X according to the comparative example refers to a light deflector without any one of the embodiments of the present disclosure. In FIGS. 3A, 3B, and 3C, components having the same functions as those of the movable device 13 according to an embodiment of the present disclosure are denoted by the same reference numerals for easy comparison with the movable device 13.

The movable device 13X in FIGS. 3A, 3B, and 3C has connecting portions 160a' and 160b'. The connecting portion 160a' is a portion connecting the movable portion 130a to the reflector 120, and the connecting portion 160b' is a portion connecting the movable portion 130b to the reflector 120. The connecting portion 160a' includes a thick portion 161a' on the −Z-surface of the connecting portion 160a' to prevent or reduce an oscillation failure of the reflector 120. The connecting portion 160b' includes a thick portion 161b' on the −Z-surface of the connecting portion 160b' to prevent or reduce an oscillation failure of the reflector 120.

Unlike the first connecting portion 160a according to an embodiment of the present disclosure, the connecting portion 160a' according to the comparative example is without the extending portion 180a. Similarly, unlike the first connecting portion 160b according to an embodiment of the present disclosure, the connecting portion 160b' according to the comparative example is without the extending portion 180b.

Such a configuration of the movable device 13X according to the comparative example may cause stress to be concentrated on the ends of the thick portions 161a' and 161b' due to the elastic deformation of the connecting portions 160a' and 160b' during oscillation of the reflector 120 with a large oscillation angle, thus possibly causing the connecting portions 160a' and 160b' to break. In FIG. 3C, for example, a stress-concentration location 300 on which stress is concentrated is at the corner of the thick portion 161b' in the connecting portion 160b', which undergoes concentration of stress particularly when the reflector 120 oscillates at a large oscillation angle.

To avoid breakage of the connecting portions 160a' and 160b' due to the stress concentration thereon, the oscillation angle of the reflector 120 is restricted to reduce the elastic deformation of the connecting portions 160a' and 160b'. Such a restriction of the oscillation angle, however, hampers the movable device 13X deflecting light with a large oscillation angle.

In contrast, at least one embodiment of the present disclosure provides the first connecting portion 160a including the extending portion 180a in which the end of the thick portion 161a is included. Further, the first connecting portion 160b includes the extending portion 180b in which the end of the first connecting portion 160b is included.

Figure 4A:
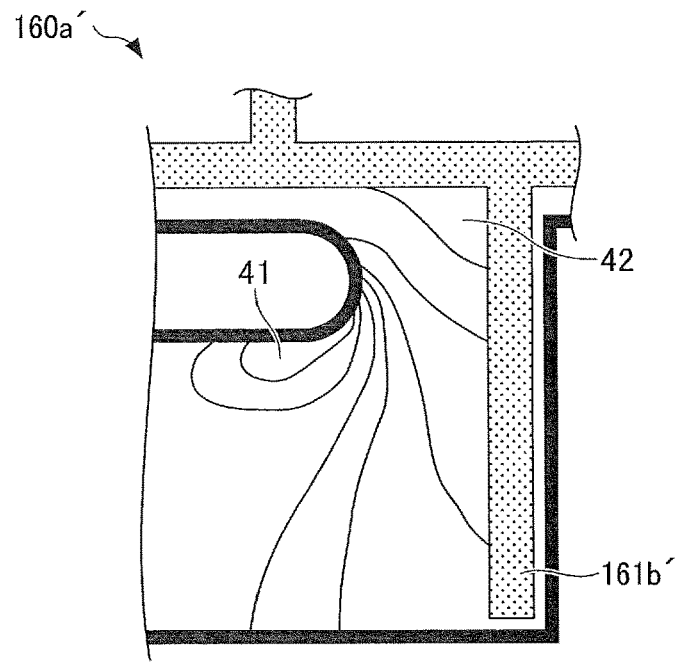
FIG. 4A is an illustration of a first example of an elastic deformation distribution in and around a connecting portion.
Figure 4B:
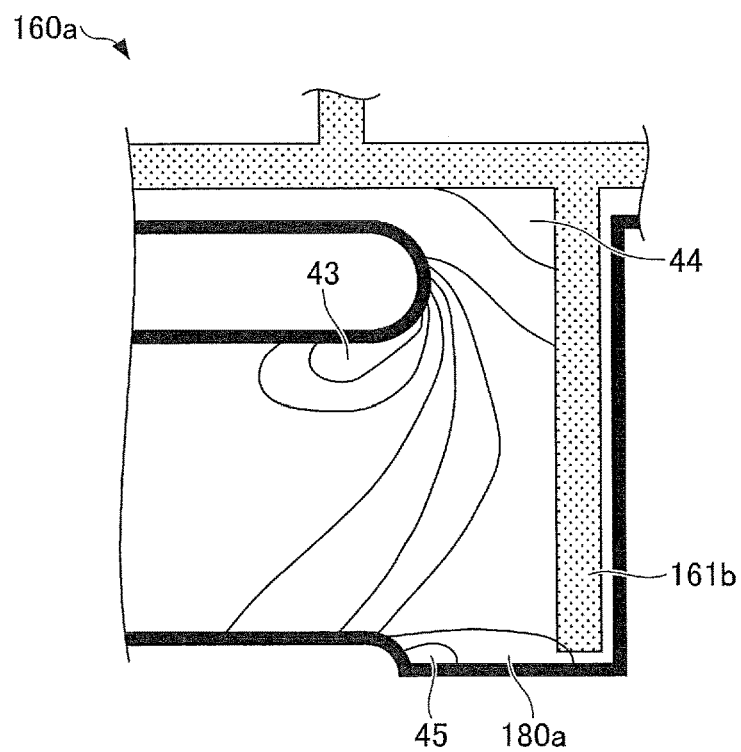
FIG. 4B is an illustration of a second example of an elastic deformation distribution in and around a connecting portion.

FIGS. 4A and 4B are illustrations of the elastic deformation distribution in and around the connecting portion. FIG. 4A is a contour plot of an elastic-deformation amount distribution during the oscillation of the reflector 120 in the configuration without the extending portions 180a and 180b according to a first example. FIG. 4B is a contour plot of an elastic-deformation amount distribution during the oscillation of the reflector 120 in the configuration provided with the extending portions 180a and 180b according to a second example.

In the connecting portion 160a' in FIG. 4A, a portion 41 indicates a large elastic deformation, and a portion 42 indicates a small elastic deformation. In the connecting portion 160a in FIG. 4B, a portion 43 indicates a large elastic deformation, and portions 44 and 45 indicate a small elastic deformation.

It can be seen from FIGS. 4A and 4B that the extending portion 180a extending from the movable beam 131a in the −X-direction reduces the elastic deformation of the first connecting portion 160a. This reduction in elastic deformation reduces stress on the thick portion 161a and the end of the thick portion 161a.

Similarly, the extending portion 180b extending from the movable beam 131b in the +X-direction reduces elastic deformation of the first connecting portion 160a during oscillation of the reflector 120. This reduction in elastic deformation reduces stress on the thick portion 161b and the end of the thick portion 161b.

Figure 4C:
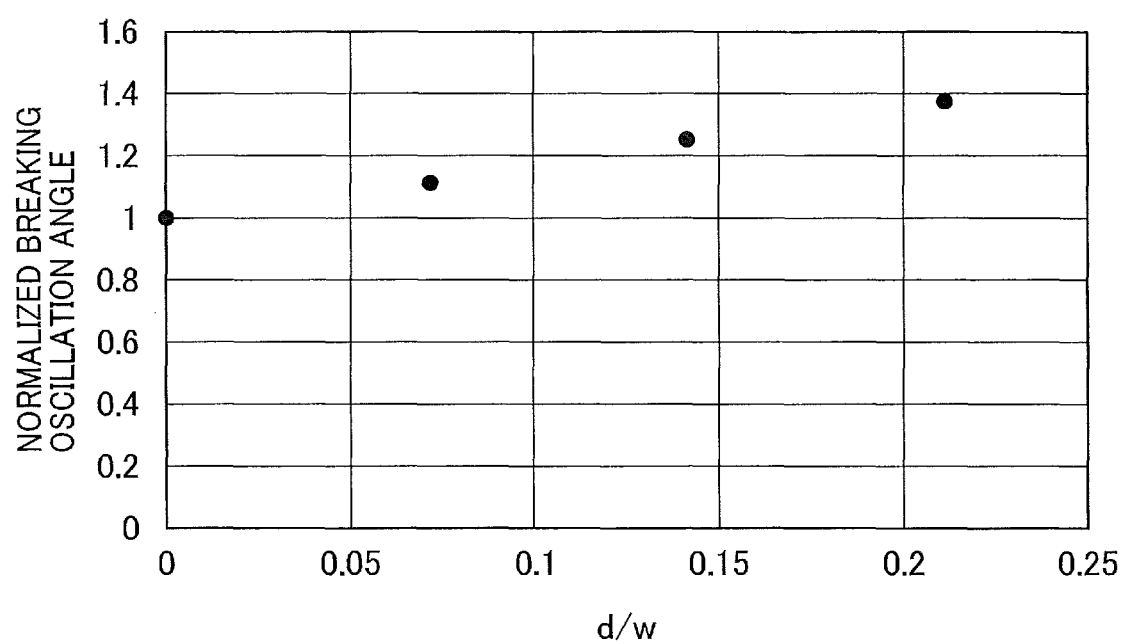
FIG. 4C is a graph of the relation between the length of an extending portion and the breaking oscillation angle.

FIG. 4C is a graph of the relation between the length of the extending portion 180b and the breaking oscillation angle. The breaking oscillation angle refer to an oscillation angle at which the movable portions 130a and 130b break.

In FIG. 4C, the horizontal axis represents the ratio d/w of the length d of the extending portion 180b in the X-direction with respect to the width w of the movable beam 131b in the X-direction, and the vertical axis represents breaking oscillation angles, which are normalized by the breaking oscillation angles when the length d is zero.

As illustrated in FIG. 4C, the breaking oscillation angle increases as the length d of the extending portion 180b and the ratio d/w increase. In other words, increasing the ratio d/w allows a greater oscillation angle of the reflector 120.

The movable beam 131b and the movable beam 132b adjacent to each other are to be apart from each other with a predetermined space therebetween in the X-direction. To allow the movable beams 131b and 132b to be apart from each other with a distance G in FIG. 1B, or the predetermined space therebetween, the length d of the extending portion 180b in the X-direction is greater than zero and less than the distance G (0<d<G). Further, the length e (FIG. 1C) of the extending portion 180b is greater than zero and less than half of the length L (FIG. 1B) of the movable beams 131b and 132b in the Y-direction (0<e<L/2). The same as the description of the example of the extending portion 180b applies to the extending portion 180a.

As described above, the movable device 13 according to the present embodiment includes the movable portion 130a having one end connected to the reflector 120 through the first connecting portion 160a, and the other end connected to the support 150 through the second connecting portion 170a.

The movable portion 130a further includes a linear movable beam 131a extending in the Y-direction intersecting the oscillation axis E. The first connecting portion 160a includes an extending portion 180a extending from the movable beam 131a in the X-direction parallel to the oscillation axis E and a thick portion 161a having a relatively large thickness and extending in the X-direction, a part of which is included in the extending portion 180a.

In this configuration, the end of the thick portion 161a is included in the extending portion 180a. As described above with reference to FIG. 4B, the extending portion 180a extending from the movable beam 131a in the −X-direction reduces an elastic deformation of the movable beam 131a during the oscillation of the reflector 120.

Such a reduction in elastic deformation reduces stress on the thick portion 161a and the end of the thick portion 161a due to the elastic deformation of the movable beam 131a. The same applies to the second extending portion 180b and the thick portion 161b in the first connecting portion 160b.

The reduction in stress on the thick portions and their ends in the connecting portions prevents breakage of the movable device 13. Such a reduction in stress further relaxes the restriction of the oscillation angle and increases the oscillation angle of the reflector 120, thus enabling the movable device 13 to deflect light with a larger oscillation angle.

Notably, including multiple extending portions such as the extending portion 180a and the extending portion 180b having different lengths d or different lengths e may unevenly distribute stress caused by the elastic deformation over the movable beams and thus cause a portion of the movable beams, which receives more stress, to more likely break.

To increase the breaking oscillation angle as appropriate at which the movable device 13 breaks, the length d and the length e of multiple extending portions 180a and 180b are equalized to eliminate uneven distribution of stresses.

Further, the elastic deformation during the oscillation of the reflector 120 increases as its position gets closer to the oscillation axis E in the first connecting portion 160a and the first connecting portion 160b, which is described above with reference to FIG. 4B. In view of such circumstances, the thick portion 161a is disposed away from the oscillation axis E as much as possible within the first connecting portion 160a, and the thick portion 161b is disposed away from the oscillation axis E as much as possible within the first connecting portion 160b. This arrangement enables an increase in the breaking oscillation angle as appropriate.

The length, or width of each of the thick portion 161a and the thick portion 161b in the Y-direction is to be less than the length e of the extending portion 180a and the extending portion 180b in the Y-direction. However, since the thick portions 161a and 161b are disposed away from the oscillation axis E as much as possible within the movable beams 131a and 131b, respectively, the length of each of the thick portions 161a and 161b in the Y-direction may be less than e/2.

In a case of employing the semiconductor processing for manufacturing the movable device 13, equalizing the thicknesses of the thick portions 161a and 161b and the thick portion 121 facilitates its manufacture and reduces cost.

Further, equalizing the thicknesses of the thick portions 161a and 161b and the thick portion 121 eliminates differences in step height between thick portions and avoids stress concentration, thus achieving a larger breaking oscillation angle.

Variation of First Embodiment

Figure 5A:
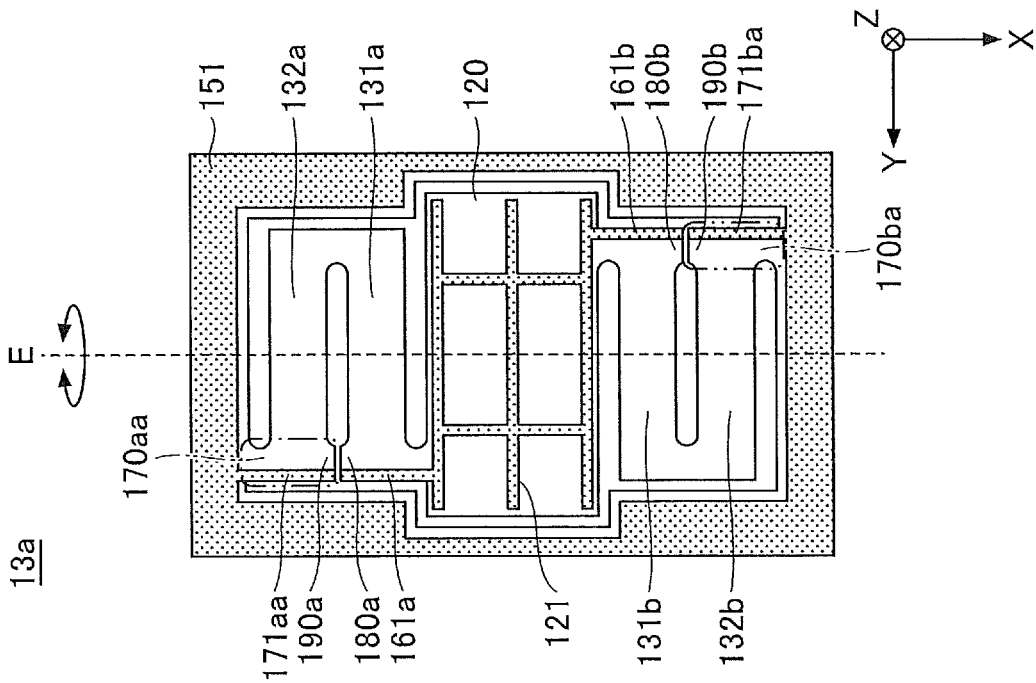
FIGS. 5A and 5B are illustrations of a configuration of a movable device according to a variation of the first embodiment.
Figure 5B:
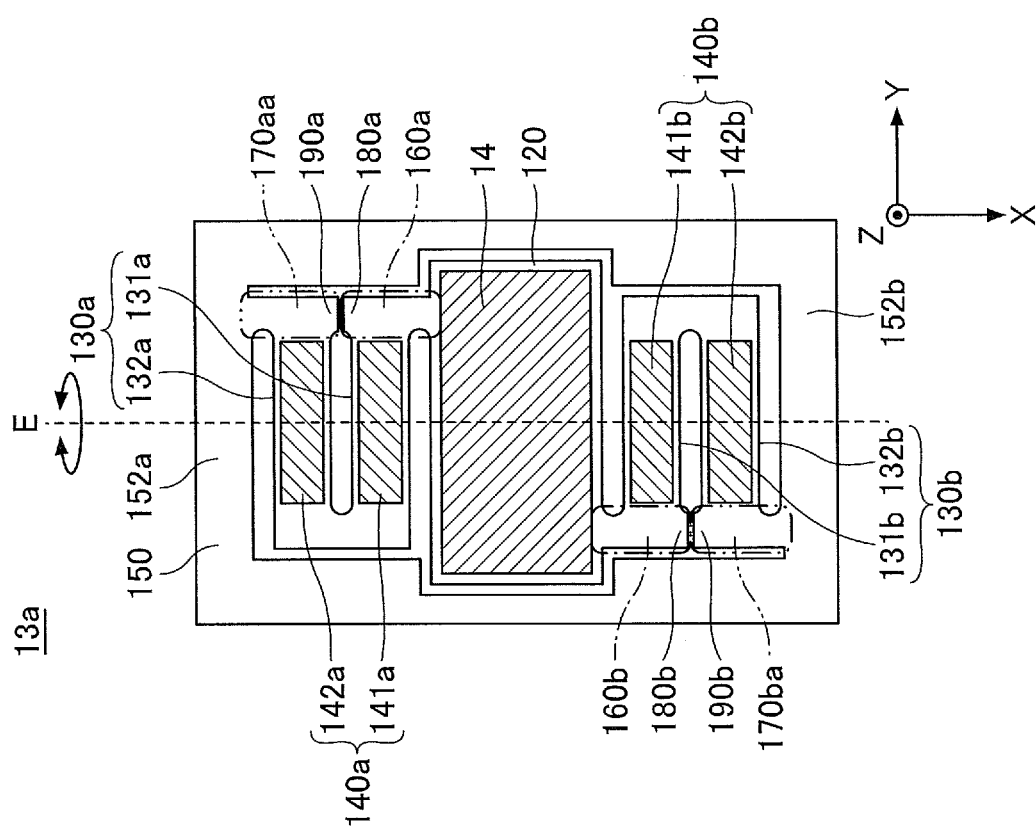

FIGS. 5A and 5B are illustrations of a configuration of a movable device 13a according to a variation of the first embodiment. FIG. 5A is a plan view of the configuration of the movable device 13a. FIG. 5B is a rear view of the configuration of the movable device 13a. In FIGS. 5A and 5B, components having the same functions as those of the movable device 13 according to the first embodiment are denoted by the same reference numerals. The same applies to each embodiment and each variation described below.

The movable portion 130a of the movable portion 130a in FIGS. 5A and 5B has one end connected to the reflector 120 through the first connecting portion 160a and the other end connected to the support 150 through the second connecting portion 170aa. The movable portion 130b in FIGS. 5A and 5B has one end connected to the reflector 120 through the first connecting portion 160b and the other end connected to the support 150 through the second connecting portion 170ab.

The second connecting portion 170aa is a portion connecting the movable portion 130a to the support 150. The support 150 has a support frame portion 152a as a second support frame portion that extends in the Y-direction. The movable portion 130a is connected to the support frame portion 152a with the second connecting portion 170aa between the movable portion 130a and the support frame portion 152a.

The second connecting portion 170aa includes an extending portion 190a extending from the movable beam 132a in the +X-direction, or along the oscillation axis E. The extending portion 190a is at the end of the second connecting portion 170aa in the X-direction, which is farther from the support 150 than the other end of the second connecting portion 170aa at which the movable beam 132a is connected to the support 150, and extends from the movable beam 132a in the +X-direction. The extending portion 190a is an example of a first extending portion that extends along the axis (e.g., the oscillation axis E).

The second connecting portion 170aa indicated by dot-dot-dash line in FIG. 5A ranges in the X-direction from the portion of the movable beam 132a in the X-direction, which is closest to and connected to the support 150, to the +X-end of the extending portion 190a at the end of the movable beam 132a in the X-direction, which is farther from the support than the other end of the movable beam 132a in the X-direction. Further, the second connecting portion 170aa has substantially the same width in the Y-direction as the width of the portion of the movable beam 132a in the Y-direction, which is connected to the support 150.

The second connecting portion 170ba is a portion of the movable portion 130b, which is connected to the support 150. The support 150 has a support frame portion 152b as a second support frame portion that extends in the Y-direction. The movable portion 130b is connected to a support frame portion 152b with the second connecting portion 170ba between the movable portion 130b and the support frame portion 152a.

The second connecting portion 170ba includes an extending portion 190b extending from the movable beam 132b in the −X-direction, or along the oscillation axis E. The extending portion 190b is at the end of the second connecting portion 170ba, which is farther from the support 150 than the other end in the X-direction at which the movable beam 132b is connected to the support 150, and extends from the movable beam 132b in the −X-direction. The extending portion 190b is an example of a first extending portion that extends along the axis (e.g., the oscillation axis E).

The second connecting portion 170ba indicated by dot-dot-dash line in FIG. 5A ranges in the X-direction from the portion of the movable beam 132b in the X-direction, which is closest to and connected to the support 150, to the −X-end of the extending portion 190b at the end of the movable beam 132b in the X-direction, which is farther from the support 150 than the other end of the movable beam 132b in the X-direction. Further, the second connecting portion 170ba has substantially the same width in the Y-direction as the width of the portion of the movable beam 132b in the Y-direction, which is connected to the support 150.

As illustrated in FIG. 5B, the second connecting portion 170aa includes a thick portion 171aa extending along the oscillation axis E, on the −Z-surface of the movable beam 132a. The thick portion 171aa is thicker than the other portions of the second connecting portion 170aa. In other words, the thick portion 171aa has a thickness larger than those of the other portions other than the thick portion 171aa in the second connecting portion 170aa. Further, a part of the thick portion 171aa extending in the X-direction is included in the extending portion 190a in the X-direction. The thick portion 171aa, which is formed to be thick, prevents or reduces distortion of the second connecting portion 170aa, and thus prevents an oscillation failure of the reflector 120 due to a resonance frequency drift, which is caused by the distortion of the second connecting portion 170aa.

Similarly, the second connecting portion 170ab includes a thick portion 171ba extending along the oscillation axis E on the −Z-surface of the movable beam 132b. The thick portion 171ba is thicker than the other portions of the second connecting portion 170ba. In other words, the thick portion 171*ba* has a thickness larger than those of the other portions other than the thick portion 171*ba* in the second connecting portion 170*ba*. Further, a part of the thick portion 171*ba* extending in the X-direction is included in the extending portion 190*b* in the X-direction. The thick portion 171*ba*, which is formed to be thick, prevents or reduces distortion of the second connecting portion 170*ba*, and thus prevents an oscillation failure of the reflector 120 due to a resonance frequency drift, which is caused by the distortion of the second connecting portion 170*ba*.

The thick portions 171*aa* and 171*ba* each have a thickness substantially equal to the thickness of the support 150. The thick portions 171*aa* and 171*ba* each are connected to the support 150.

In the present variation, the end of the thick portion 171*aa* is included in the extending portion 190*a*, and the end of the thick portion 171*ba* is included in the extending portion 190*b*. The extending portion 190*a* extending from the movable beam 132*a* in the +X-direction and the extending portion 190*b* extending from the movable beam 132*b* in the −X-direction reduce an elastic deformation of the movable beams 132*a* and 132*b* during the oscillation of the reflector 120.

Such a reduction in elastic deformation reduces stresses on the thick portions 171*aa* and 171*ba* and their ends due to the elastic deformation of the movable beams 132*a* and 132*b*. Such a reduction in stress further relaxes the restriction of the oscillation angle and increases the oscillation angle of the reflector 120, thus enabling the movable device 13*a* to deflect light with a larger oscillation angle. Notably, the other advantages of the present variation are similar to those of the first embodiment of the present disclosure as described above.

Second Embodiment

Next, a movable device 13*b* according to a second embodiment is described. FIGS. 6A and 6B are illustrations of a configuration of the movable device 13*b*. FIG. 6A is a plan view of the configuration of the movable device 13*b*. FIG. 6B is a rear view of the configuration of the movable device 13*b*.

In other words, the movable portion 130*b* has a meander structure in which adjacent ends of the movable beams 131*a* and 132*a* are coupled to each other to form a coupling portion 200*a*. The movable portion 130*b* has a meander structure in which adjacent ends of the movable beams 131*b* and 132*b* are coupled to each other to form a coupling portion 200*b*.

The coupling portion 200*a* is a portion coupling the movable beam 131*a* to the movable beam 132*a*. The coupling portion 200*a* includes an extending portion 210*a* extending from the movable beam 131*a* in the +X-direction and an extending portion 220*a* extending from the movable beam 132*a* in the −X-direction. Each of the extending portions 210*a* and 220*a* is an example of a second extending portion.

The extending portion 210*a* is at an end of the coupling portion 200*a* in the X-direction, which is closer to the reflector 120 than the other end of the coupling portion 200*a* in the X-direction, and extends from the movable beam 131*a* in the +X-direction. The extending portion 220*a* is at the other end of the coupling portion 200*a* in the X-direction and extends from the movable beam 132*a* in the −X-direction.

The coupling portion 200*a* indicated by thick broken line in FIG. 6A ranges from the +X-edge of the extending portion 210*a* to the −X-edge of the extending portion 220*a*. The coupling portion 200*a* further has a width equal to the width of each of the extending portions 210*a* and 220*a* in the Y-direction.

The coupling portion 200*b* is a portion coupling the movable beam 131*b* to the movable beam 132*b*. The coupling portion 200*b* includes an extending portion 210*b* extending from the movable beam 131*b* in the −X-direction and an extending portion 220*b* extending from the movable beam 132*b* in the +X-direction. Each of the extending portions 210*b* and 220*b* is an example of a second extending portion.

The extending portion 210*b* is at an end of the coupling portion 200*b* in the X-direction, which is closer to the reflector 120 than the other end of the coupling portion 200*b* in the X-direction, and extends from the movable beam 131*b* in the −X-direction. The extending portion 220*b* is at the other end of the coupling portion 200*b* in the X-direction and extends from the movable beam 132*b* in the +X-direction.

The coupling portion 200*b* indicated by thick broken line in FIG. 6A ranges from the −X-edge of the extending portion 210*b* to the +X-edge of the extending portion 220*b*. The coupling portion 200*b* further has a width equal to the width of each of the extending portions 210*b* and 220*b* in the Y-direction.

As illustrated in FIG. 6B, the coupling portion 200*a* includes a thick portion 201*a* as a second thick portion extending along the oscillation axis E, on the −Z-surface of the coupling portion 200*a* of the movable beam 131*a*. The thick portion 201*a* is thicker than the other portion of the coupling portion 200*a*. In other words, the thick portion 201*a* has a thickness larger than those of the other portions other than the thick portion 201*a* in the coupling portion 200*a*. Further, a part of the thick portion 201*a* in the X-direction is included in the extending portion 210*a*, and another part of the thick portion 201*a* in the X-direction is included in the extending portion 220*a*. The thick portion 201*a* extends in the X-direction. The thick portion 201*a*, which is formed to be thick, prevents or reduces distortion of the coupling portion 200*a*, and thus prevents an oscillation failure of the reflector 120 due to a resonance frequency drift, which is caused by the distortion of the coupling portion 200*a*.

As illustrated in FIG. 6B, the coupling portion 200*b* includes a thick portion 201*b* as a second thick portion extending along the oscillation axis E, on the −Z-surface of the coupling portion 200*b* of the movable beam 131*b*. The thick portion 201*b* is thicker than the other portion of the coupling portion 200*b*. In other words, the thick portion 201*b* has a thickness larger than those of the other portions other than the thick portion 201*b* in the coupling portion 200*b*. Further, a part of the thick portion 201*b* in the X-direction is included in the extending portion 210*b*, and another part of the thick portion 201*b* in the X-direction is included in the extending portion 220*b*. The thick portion 201*b* extends in the X-direction. The thick portion 201*b*, which is formed to be thick, prevents or reduces distortion of the coupling portion 200*b*, and thus prevents an oscillation failure of the reflector 120 due to a resonance frequency drift, which is caused by the distortion of the coupling portion 200*b*.

In the present embodiment, the ends of the thick portion 201*a* in the X-direction are included in the extending portions 210*a* and 220*a*, respectively, and the ends of the thick portion 201*b* in the X-direction is included in the extending portions 210*b* and 220*b*, respectively. The extending portion 210*a* extends from the movable beam 131*a* in the +X-direction, and the extending portion 220*a* extends from the movable beam 132a in the −X-direction. The extending portion 210b extends from the movable beam 131ba in the −X-direction, and the extending portion 220b extends from the movable beam 132b in the +X-direction. Such extending portions 210a, 220a, 210b, and 220b reduce elastic deformation of the movable beams 131a, 132a, 131b, and 132b.

Such a reduction in elastic deformation reduces stresses imposed on the ends of the thick portions 201a and 201b due to the elastic deformation of the movable beams 131a, 132a, 131b, and 132b. Such a reduction in stress further relaxes the restriction of the oscillation angle and increases the oscillation angle of the reflector 120, thus enabling the movable device 13b to deflect light with a larger oscillation angle.

Notably, as a portion of each of the coupling portions 200a and 200b distorts more significantly as its position gets closer to the oscillation axis E, the thick portions 201a and 201b closer to the oscillation axis E undergo more stress concentration at their ends. To reduce stress concentration effectively, the thick portions 201a and 201b are to be away from the oscillation axis E as much as possible.

Notably, the other advantages of the present embodiment are similar to those of the first embodiment of the present disclosure as described above.

Variation of Second Embodiment

FIGS. 7A and 7B are illustrations of a configuration of a movable device 13c according to a variation of the second embodiment. FIG. 7A is a plan view of the configuration of the movable device 13c. FIG. 7B is a rear view of the configuration of the movable device 13c.

The movable portion 130a of the movable device 13c in FIGS. 7A and 7B has one end connected to the reflector 120 through the first connecting portion 160a and the other end connected to the support 150 through the second connecting portion 170aa. The movable portion 130b in FIGS. 5A and 5B has one end connected to the reflector 120 through the first connecting portion 160b and the other end connected to the support 150 through the second connecting portion 170ab.

The configuration and function of each of the second connecting portions 170aa and 170ba are the same as those described in the variation (see FIGS. 5A and 5B) of the first embodiment, and thus redundant description is omitted. Further, as the effects of the movable device 13c are the same as those of the movable device 13a according to the variation of the first embodiment, redundant description will be omitted.

Third Embodiment

Next, a movable device 13d according to a third embodiment is described. FIGS. 8A and 8B are illustrations of a configuration of the movable device 13d. FIG. 8A is a plan view of the configuration of the movable device 13d. FIG. 8B is a rear view of the configuration of the movable device 13d.

The movable portion 130a of the movable device 13d in FIGS. 8A and 8B has one end connected to the reflector 120 through the first connecting portion 160ad. The movable portion 130b in FIGS. 8A and 8B has one end connected to the reflector 120 through the first connecting portion 160bd.

The first connecting portion 160ad is a portion connecting the movable portion 130a to the reflector 120. The first connecting portion 160ad includes an extending portion 230a extending from the movable beam 131a in the Y-direction, or a direction intersecting the oscillation axis E. The extending portion 230a is at the +Y-end of the first connecting portion 160ad in the Y-direction (i.e., the end of a portion connecting the movable beam 131a and the reflector 120 in the Y-direction), and extends from the movable beam 131a in the +Y-direction. The extending portion 230a is an example of a third extending portion that extends in the direction intersecting the oscillation axis E.

The first connecting portion 160ad indicated by a dashed-dotted line in FIG. 8A ranges in the X-direction from the portion of the movable beam 131a in the X-direction, which is closest to and connected to the reflector 120, to the −X-end of the extending portion 180a at the end of the movable beam 131a in the X-direction, which is farther from the reflector 120 than the other end of the movable beam 131a in the X-direction. Further, the first connecting portion 160ad ranges in the Y-direction from the +Y-end of the extending portion 230a to the −Y-end (i.e, the opposite end of the +Y-end of the extending portion 230a) of the portion connecting the movable beam 131a to the reflector 120.

The first connecting portion 160bd is a portion connecting the movable portion 130a to the reflector 120. The first connecting portion 160bd includes an extending portion 230b extending from the movable beam 131b in the Y-direction, or a direction intersecting the oscillation axis E. The extending portion 230b is at the −Y-end of the first connecting portion 160bd in the Y-direction (i.e., the end of the portion connecting the movable beam 131a to the reflector 120 in the Y-direction), and extends from the movable beam 131b in the −Y-direction.

The first connecting portion 160bd indicated by a dashed-dotted line in FIG. 8A ranges in the X-direction from the portion of the movable beam 131b in the X-direction, which is closest to and connected to the reflector 120, to the end of the extending portion 180b at the end of the movable beam 131b in the X-direction, which is farther from the reflector 120 than the other end of the movable beam 131b in the X-direction. Further, the first connecting portion 160bd ranges in the −Y-direction from the −Y-end of the extending portion 230b to the +Y-end (i.e, the opposite end of the −Y-end of the extending portion 230b) of the portion connecting the movable beam 131b to the reflector 120.

As illustrated in FIG. 8B, the first connecting portion 160ad includes a thick portion 161ad as a third thick portion on the −Z-surface of the movable beam 131a. The thick portion 161ad is thicker than the other portions of the first connecting portion 160ad. In other words, the thick portion 161ad has a thickness larger than those of the other portions other than the thick portion 161ad in the first connecting portion 160ad. Further, a part of the thick portion 161ad is included in the extending portion 230a in the Y-direction, and extends in the X-direction. The thick portion 161ad, which is formed to be thick, prevents or reduces distortion of the first connecting portion 160ad, and thus prevents an oscillation failure of the reflector 120 due to a resonance frequency drift, which is caused by the distortion of the first connecting portion 160ad.

Similarly, the first connecting portion 160bd includes a thick portion 161bd as a third thick portion on the −Z-surface of the movable beam 131b. The thick portion 161bd is thicker than the other portions of the first connecting portion 160bd. In other words, the thick portion 161bd has a thickness larger than those of the other portions other than the thick portion 161bd in the first connecting portion 160bd. Further, a part of the thick portion 161bd is included in the extending portion 230b in the Y-direction, and extends in the X-direction. The thick portion 161bd, which is formed to be thick, prevents or reduces distortion of the first connecting portion 160*bd*, and thus prevents an oscillation failure of the reflector 120 due to a resonance frequency drift, which is caused by the distortion of the first connecting portion 160*bd*.

The thick portions 161*ad* and 161*bd* each have a thickness substantially equal to the thickness of the thick portion 121 on the −Z-surface of the reflector 120. The thick portions 161*ad* and 161*bd* each are connected to the thick portion 121.

Figure 9:
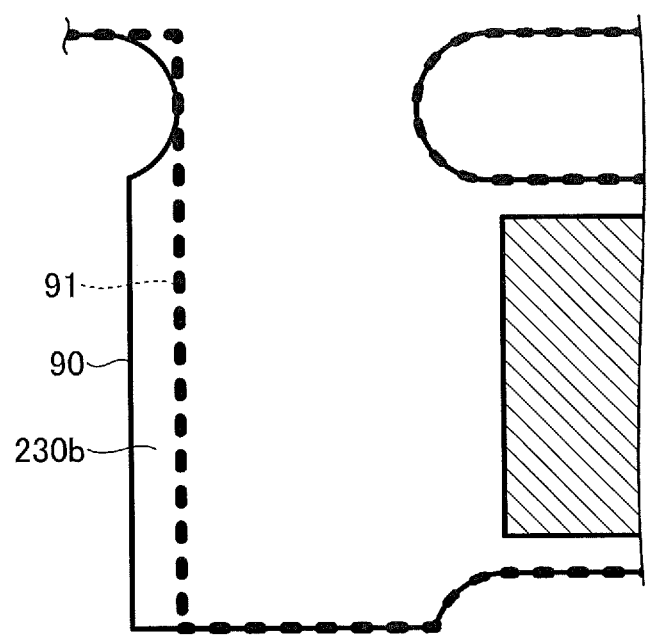
FIG. 9 is a partial enlarged view of an area C in FIG. 8A.

FIG. 9 is a partial enlarged view of an area C in FIG. 8A. An outline 90 indicates an outer edge face of the first connecting portion 160*bd*, and an outline 91 indicates an outer edge face of the first connecting portion 160*b* according to the first embodiment. In FIG. 9, the outline 90 protrudes beyond the outline 91 in the −Y-direction. This protruding portion corresponds to the extending portion 230*b*.

In the present variation, the end of the thick portion 161*ad* in the Y-direction is included in the extending portion 230*a*, and the end of the thick portion 161*bd* in the Y-direction is included in the extending portion 230*b*. The extending portion 230*a* extending from the movable beam 131*a* in the +Y-direction and the extending portion 230*b* extending from the movable beam 131*b* in the −Y-direction reduce an elastic deformation of the movable beams 131*a* and 131*b* during the oscillation of the reflector 120.

Such a reduction in elastic deformation reduces stresses on the thick portions 161*ad* and 161*bd* and their ends due to the elastic deformation of the movable beams 131*a* and 131*b*. Such a reduction in stress further relaxes the restriction of the oscillation angle and increases the oscillation angle of the reflector 120, thus enabling the movable device 13*d* to deflect light with a larger oscillation angle. Notably, the other advantages of the present variation are similar to those of the first embodiment of the present disclosure as described above.

Variation of Third Embodiment

Figure 10B:
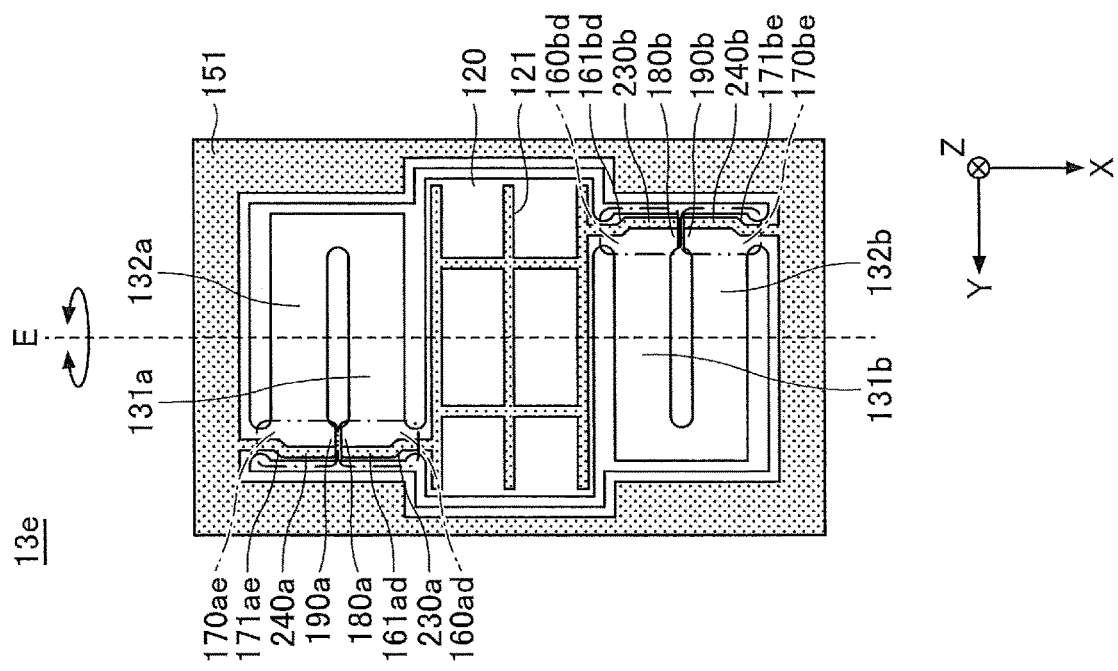
FIGS. 10A and 10B are illustrations of a configuration of a movable device according to a variation of the third embodiment.
Figure 10A:
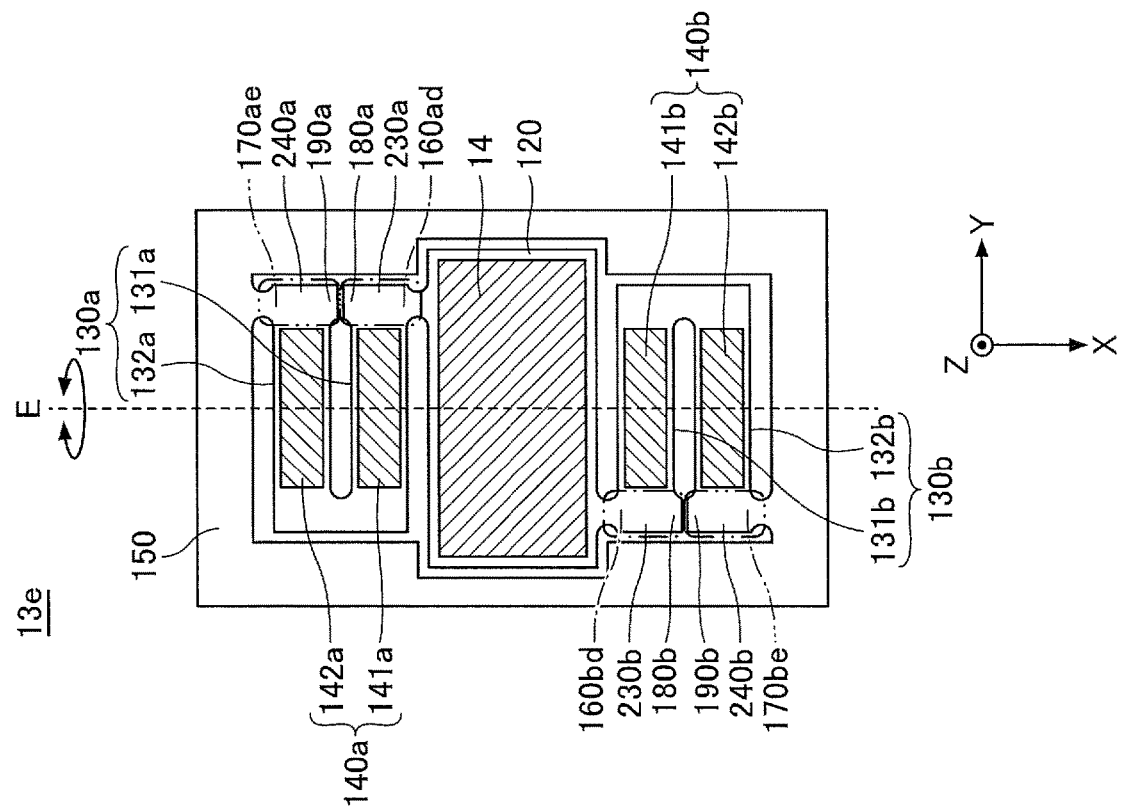

FIGS. 10A and 10B are illustrations of a configuration of a movable device 13*e* according to a variation of the third embodiment. FIG. 10A is a plan view of the configuration of the movable device 13*e*. FIG. 10B is a rear view of the configuration of the movable device 13*e*.

The movable portion 130*a* of the movable device 13*e* in FIGS. 10A and 10B has one end connected to the reflector 120 through a first connecting portion 160*ad* and the other end connected to the support 150 through a second connecting portion 170*ae*. The movable portion 130*b* in FIGS. 10A and 10B has one end connected to the reflector 120 through a first connecting portion 160*bd* and the other end connected to the support 150 through a second connecting portion 170*be*.

The second connecting portion 170*ae* includes an extending portion 240*a* and a thick portion 171*ae*. The second connecting portion 170*be* includes an extending portion 240*b* and a thick portion 171*be*.

The configuration and function of the second connecting portion 170*ae* are the same as those of the first connecting portion 160*ad*. The configuration and function of the second connecting portion 170*be* are the same as those of the first connecting portion 160*bd*. Thus, the description of the configurations and functions of the second connecting portion 170*ae* and the second connecting portion 170*be* is omitted. Further, as the effects of the movable device 13*e* are the same as those of the movable device 13*d* according to the third embodiment, redundant description will be omitted.

Fourth Embodiment

Next, a movable device 13*f* according to the fourth embodiment will be described. FIGS. 11A and 11B are illustrations of a configuration of the movable device 13*f*. FIG. 11A is a plan view of the configuration of the movable device 13*f*. FIG. 11B is a rear view of the configuration of the movable device 13*f*.

In other words, the movable portion 130*b* has a meander structure in which adjacent ends of the movable beams 131*a* and 132*a* are coupled to each other to form a coupling portion 200*af*. The movable portion 130*f* has a meander structure in which adjacent ends of the movable beams 131*b* and 132*b* are coupled to each other to form a coupling portion 200*bf*.

The coupling portion 200*af* is a portion coupling the movable beam 131*a* to the movable beam 132*a*. The coupling portion 200*af* includes an extending portion 250*a* extending from the movable 131*a* in the −Y-direction, or a direction intersecting the oscillation axis E. The extending portion 250*a* is at the −Y-end of the coupling portion 200*af* in the Y-direction (i.e., the opposite end of the other end at which the movable beam 131*a* is connected to the reflector 120 in the Y-direction), and protrudes from the movable beam 131*a* in the −Y-direction.

The coupling portion 200*af* includes an extending portion 260*a* extending from the movable 132*a* in the −Y-direction, or the direction intersecting the oscillation axis E. The extending portion 260*a* is at the −Y-end of the coupling portion 200*af* in the Y-direction (i.e., the opposite end of the other end at which the movable beam 131*a* is connected to the support 150 in the Y-direction), and protrudes from the movable beam 132*a* in the −Y-direction.

The coupling portion 200*af* indicated by thick broken line in FIG. 11A ranges from the +X-edge of the extending portion 210*a* to the −X-edge of the extending portion 220*a*. The coupling portion 200*af* further has a width equal to the width of each of the extending portions 210*a* and 220*a* in the Y-direction.

The coupling portion 200*bf* is a portion coupling the movable beam 131*b* to the movable beam 132*b*. The coupling portion 200*bf* includes an extending portion 250*b* extending from the movable beam 131*b* in the +Y-direction, or the direction intersecting the oscillation axis E. The extending portion 250*b* is at the +Y-end of the coupling portion 200*bf* in the Y-direction (i.e., the opposite end of the other end at which the movable beam 131*b* is connected to the reflector 120 in the Y-direction), and protrudes from the movable beam 131*b* in the +Y-direction.

The coupling portion 200*bf* includes an extending portion 260*b* extending from the movable beam 132*b* in the +Y-direction, or the direction intersecting the oscillation axis E. The extending portion 260*b* is at the +Y-end of the coupling portion 200*bf* in the Y-direction (i.e., the opposite end of the other end at which the movable beam 132*b* is connected to the support 150 in the Y-direction), and protrudes from the movable beam 132*b* in the +Y-direction.

The coupling portion 200*bf* indicated by thick broken line in FIG. 11B ranges from the −X-edge of the extending portion 210*b* to the +X-edge of the extending portion 220*b*. The coupling portion 200*bf* further has a width equal to the width of each of the extending portions 210*a* and 220*a* in the Y-direction.

As illustrated in FIG. 11B, the coupling portion 200*af* includes a thick portion 201*af* as a fourth thick portion extending along the oscillation axis E, on the −Z-surface of the movable beams 131*a* and 132*a*. The thick portion 201*af* is thicker than the other portion of the coupling portion 200*af*. In other words, the thick portion 201*af* has a thickness larger than those of the other portions other than the thick portion 201*ab* in the coupling portion 200*af*. Further, a part of the thick portion 201*af* in the Y-direction is included in the coupling portion 200*af*, another part of the thick portion 201*af* in the Y-direction is included in the extending portion 250*a*, and still another part of the thick portion 201*af* is included in the extending portion 260*a*. The thick portion 201*af* extends in the X-direction. The thick portion 201*af*, which is formed to be thick, prevents or reduces distortion of the coupling portion 200*af*, and thus prevents an oscillation failure of the reflector 120 due to a resonance frequency drift, which is caused by the distortion of the coupling portion 200*af*.

Similarly, the coupling portion 200*bf* includes a thick portion 201*bf* as a fourth thick portion extending along the oscillation axis E, on the −Z-surface of the movable beams 131*b* and 132*b*. The thick portion 201*bf* is thicker than the other portion of the coupling portion 200*bf*. In other words, the thick portion 201*bf* has a thickness larger than those of the other portions other than the thick portion 201*bf* in the coupling portion 200*bf*. Further, a part of the thick portion 201*bf*, which extends in the X-direction, in the Y-direction is included in the coupling portion 200*bf*, another part of the thick portion 201*bf* in the Y-direction is included in the extending portion 250*b*, and still another part of the thick portion 201*bf* in the Y-direction is included in the extending portion 260*b*. The thick portion 201*bf*, which is formed to be thick, prevents or reduces distortion of the coupling portion 200*bf*, and thus prevents an oscillation failure of the reflector 120 due to a resonance frequency drift, which is caused by the distortion of the coupling portion 200*bf*.

In the present embodiment, the end of the thick portion 201*af* in the Y-direction is included in the extending portions 250*a* and 260*a*, and the end of the thick portion 201*bf* in the Y-direction is included in the extending portions 250*b* and 260*b*. The extending portion 250*a* extends from the movable beam 131*a* in the −Y-direction, and the extending portion 260*a* extends from the movable beam 132*a* in the −Y-direction. The extending portion 250*b* extends from the movable beam 131*b* in the +Y-direction, and the extending portion 260*b* extends from the movable beam 132*b* in the +Y-direction. Such extending portions 250*a*, 260*a*, 250*b*, and 260*b* reduce elastic deformation of the movable beams 131*a*, 132*a*, 131*b*, and 132*b*.

Such a reduction in elastic deformation reduces stresses on the thick portions 201*af* and 201*bf* and their ends due to the elastic deformation of the movable beams 131*a*, 132*a*, 131*b*, and 132*b*. Such a reduction in stress further relaxes the restriction of the oscillation angle and increases the oscillation angle of the reflector 120, thus enabling the movable device 13*f* to deflect light with a larger oscillation angle.

Notably, as a portion of each of the coupling portions 200*af* and 200*bf* distorts more significantly as its position gets closer to the oscillation axis E, the thick portions 201*af* and 201*bf* closer to the oscillation axis E undergo more stress concentration at their ends. To reduce stress concentration effectively, the thick portions 201*af* and 201*bf* are to be away from the oscillation axis E as much as possible.

Notably, the other advantages of the present embodiment are similar to those of the first embodiment of the present disclosure as described above.

Variation of Fourth Embodiment

FIGS. 12A and 12B are illustrations of a configuration of a movable device 13*g* according to a variation of the fourth embodiment. FIG. 12A is a plan view of the configuration of the movable device 13*g*. FIG. 12B is a rear view of the configuration of the movable device 13*g*.

The movable portion 130*a* of the movable device 13*g* in FIGS. 12A and 12B has one end connected to the reflector 120 through the first connecting portion 160*ad* and the other end connected to the support 150 through the second connecting portion 170*ae*. The movable portion 130*b* in FIGS. 10A and 10B has one end connected to the reflector 120 through a first connecting portion 160*bd* and the other end connected to the support 150 through a second connecting portion 170*be*.

The configuration and function of the second connecting portion 170*ae* are the same as those of the first connecting portion 160*ad*. The configuration and function of the second connecting portion 170*be* are the same as those of the first connecting portion 160*bd*. Thus, the description of the configurations and functions of the second connecting portion 170*ae* and the second connecting portion 170*be* is omitted. Further, as the effects of the movable device 13*g* are the same as those of the movable device 13*e* according to the variation of the third embodiment, redundant description will be omitted.

Fifth Embodiment

Next, a movable device 13*h* according to the fifth embodiment will be described. FIGS. 13A and 13B are illustrations of a configuration of the movable device 13*h*. FIG. 13A is a plan view of the configuration of the movable device 13*h*. FIG. 13B is a rear view of the configuration of the movable device 13*h*.

In the present embodiment, a movable portion 130*ha* includes one movable beam 131*a*, and an actuator 140*ha* includes one the piezoelectric element 141*a* on the movable beam 131*a*. A movable portion 130*hb* includes one movable beam 131*b*, and an actuator 140*hb* includes one piezoelectric element 141*b* on the movable beam 131*b*. However, multiple piezoelectric elements 141*a* may be included. In some examples, a piezoelectric element that does not serve as an actuator but detects, for example an oscillation angle may be included in the movable beam 131*a* separately from another actuator 140*b*.

The configuration in which each of the movable portions 130*ha* and 130*hb* includes one movable beam also exhibits the same advantageous effects as the first embodiment by incorporating the extending portions 180*a* and 180*b* and the thick portions 161*a* and 161*b*. The configuration in which each of the movable portions 130*ha* and 130*hb* includes one movable beam exhibits the same advantageous effects by incorporating any one of the above-described embodiments and variations.

The movable device 13 according to at least one embodiment may be incorporated in various systems and devices. The following describes application examples of the movable device 13 in various systems and devices.

Figure 14:
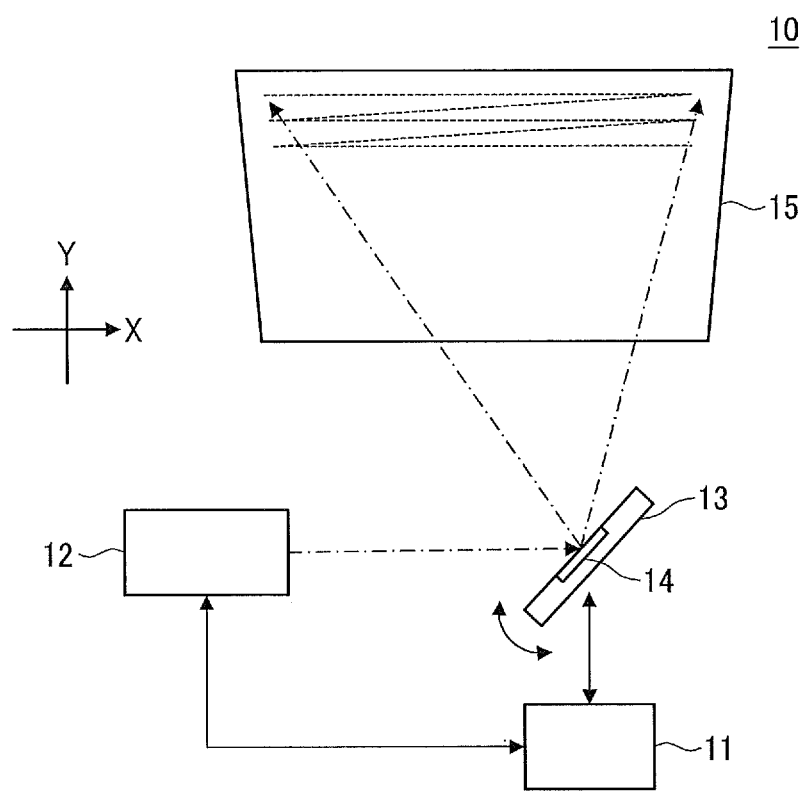
FIG. 14 is a schematic view of an optical scanning system according to an embodiment of the present disclosure.

With initially reference to FIGS. 14 to 17, an optical scanning system incorporating a movable device according to an embodiment is described below in detail. FIG. 14 is a schematic view of an example of an optical scanning system 10. As illustrated in FIG. 14, the optical scanning system 10 deflects light emitted from a light-source device 12 under control of a control device 11, by using a reflecting surface 14 included in the movable device 13, so as to optically scan a target surface 15 to be scanned (hereinafter, referred to as target surface). The optical scanning system 10 is an example of a light deflecting device.

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). For example, the movable device 13 is provided with a reflecting surface 14, and the movable device 13 serves as a micro-electromechanical system (MEMS) that is capable of moving the reflecting surface 14. The movable device 13 is an example of a light deflecting device.

The light-source device 12 is, for example, a laser device that emits a laser beam. The surface 15 to be scanned is, for example, a screen.

The control device 11 generates control instructions of the light-source device 12 and the movable device 13 using acquired optical-scanning information, and outputs drive signals to the light-source device 12 and the movable device 13 in accordance with the control instructions. The light-source device 12 emits light in accordance with the received drive signal. The movable device 13 moves the reflecting surface 14 in at least one of a uniaxial direction and a biaxial direction, in accordance with the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Next, the hardware configuration of an example of the optical scanning system 10 is described referring to FIG. 15. FIG. 15 is a hardware block diagram of an example of the optical scanning system. As illustrated in FIG. 15, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to control the entirety of the control device 11.

The RAM 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device includes, for example, a host device such as a PC (Personal Computer), and a storage device such as a USB memory, an SD card, a CD, a DVD, an HDD, and an SSD. For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or the network through the external I/F 24. The CPU 20 may have any configuration that acquires optical scanning information. In some examples, the optical scanning information may be stored in the ROM 22 or in the FPGA 23 of the control device 11. In some other examples, a storage device such as a solid state disk (SSD) may be additionally provided in the control device 11 and the optical scanning information may be stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. Furthermore, for example, the optical scanning information is irradiation data indicating the timing and range of irradiation of light for object recognition by optical scanning.

The control device 11 has the hardware configuration in FIG. 15, and the components of the hardware configuration operate in accordance with instructions from the CPU 20 to implement the capabilities of the functional configuration as described below.

Next, the functional configuration of the control device 11 of the optical scanning system 10 is described below referring to FIG. 16. FIG. 16 is a functional block diagram of the control device 11 of the optical scanning system 10, according to an embodiment of the present disclosure.

As illustrated in FIG. 16, the control device 11 has the functions of a controller 30 and a driving-signal output unit 31.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Next, the process of optically scanning the target surface 15 performed by the optical scanning system 10 is described referring to FIG. 17. FIG. 17 is a flowchart of an example of processing performed by the optical scanning system 10.

In step S11, the controller 30 acquires optical-scanning information from, for example, an external device. In step S12, the controller 30 generates control signals from the acquired optical-scanning information, and outputs the control signals to the drive-signal output unit 31. In step S13, the drive-signal output unit 31 outputs drive signals to the light-source device 12 and the movable device 13 based on the received control signals. In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the movable device 13 provided with the reflecting surface 14, which are elements of the above optical scanning system 10.

As described above, the optical scanning system incorporating the movable device 13 according to at least one embodiment achieves an increase in oscillation angle and enables optical scanning with a large scanning angle.

An image projection apparatus incorporating a movable device according to at least one embodiment is described in detail with reference to FIGS. 18 and 19.

FIG. 18 is a schematic view of a vehicle 400 equipped with a HUD 500 as an example of an image projection device according to an embodiment. FIG. 6 is a schematic view of an example of the HUD 500. The vehicle 400 is an example of a mobile object.

The image projection apparatus is an apparatus that projects an image by optical scanning, and is, for example, a HUD.

As illustrated in FIG. 18, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 19:
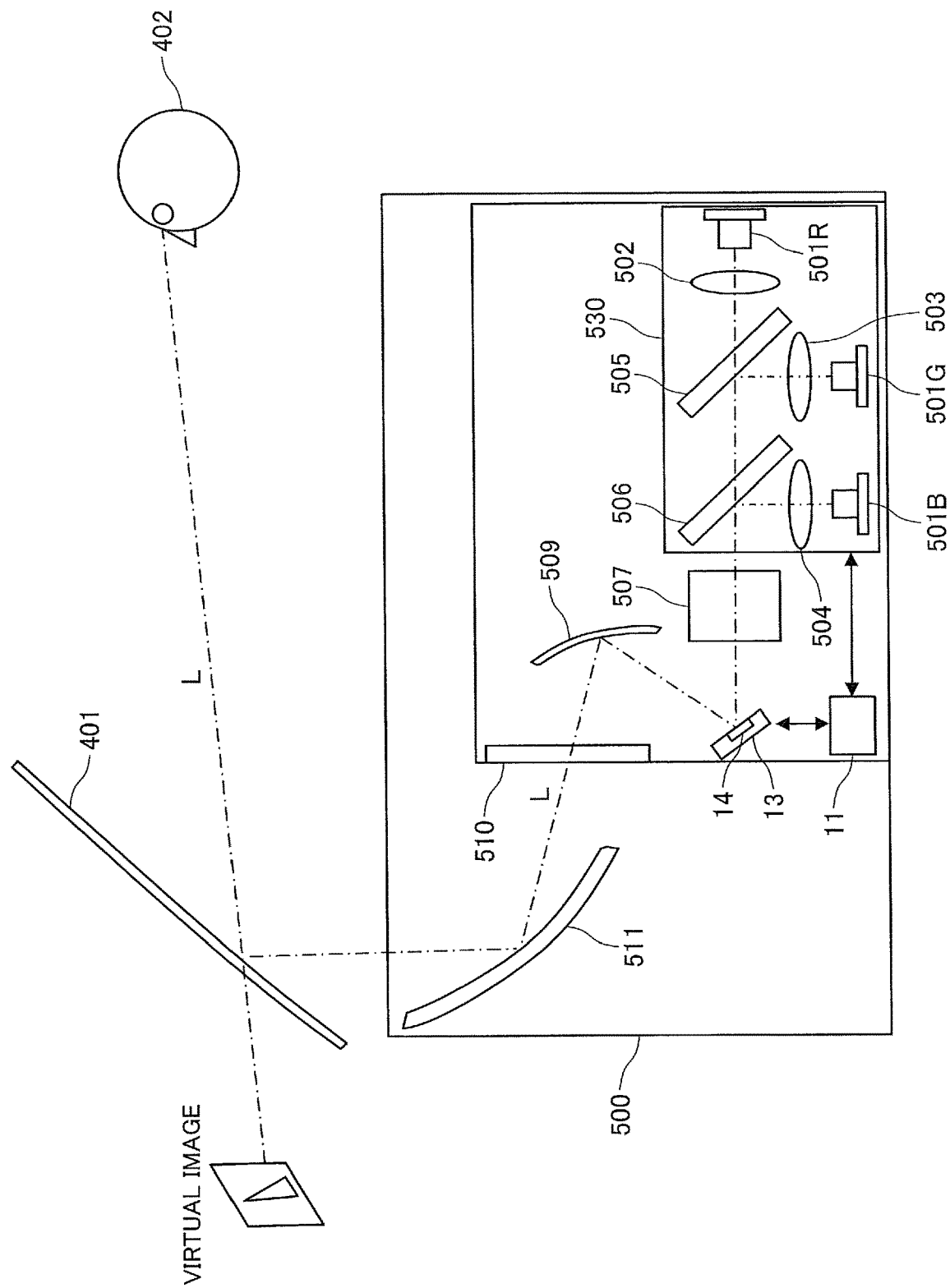
FIG. 19 is a schematic view of a HUD according to an embodiment of the present disclosure.

As illustrated in FIG. 19, the HUD 500 emits laser beams from red, green, and blue laser-beam sources 501R, 501G, and 501B, respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, and then two-dimensional scanning is performed by the movable device 13 provided with the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which multiple microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The movable device 13 is controlled in synchronization with the light-emitting timing of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

As described above, an image projection apparatus incorporating the movable device 13 according to at least one embodiment achieves an increase in oscillation angle and enables optical scanning with a large scanning angle.

Next, an optical writing device incorporating the movable device 13 according to an embodiment of the present disclosure is described in detail with reference to FIGS. 20 and 21.

Figure 20:
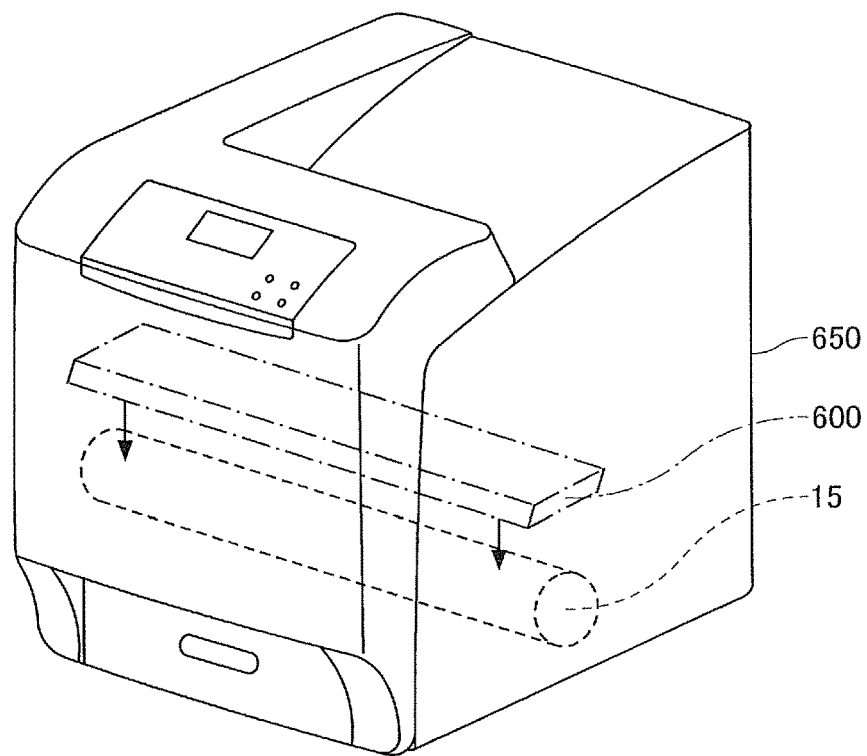
FIG. 20 is a schematic view of an example of an image forming apparatus equipped with an optical writing device.

FIG. 20 is an illustration of an example of an image forming apparatus equipped with the optical writing device 600. FIG. 21 is a schematic view of an example of the optical writing device 600.

As illustrated in FIG. 20, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 21:
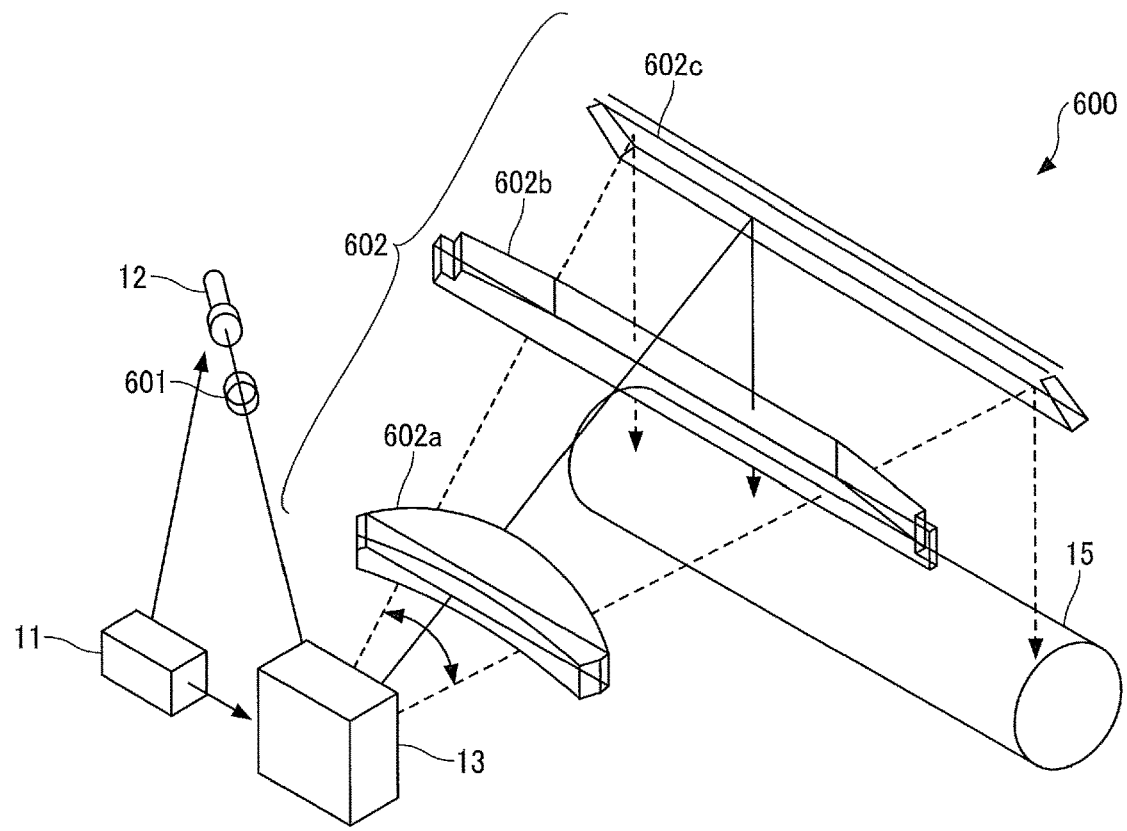
FIG. 21 is a schematic view of an example of the optical writing device.

As illustrated in FIG. 21, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are controlled by the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device saves power of the optical writing device because power consumption for driving the movable device 13 is less than that for driving a rotational polygon mirror. The movable device 13 makes a smaller wind noise when the mirror substrate oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

As described above, the optical writing device incorporating the movable device 13 according to at least one embodiment achieves an increase in oscillation angle and enables optical scanning with a large scanning angle.

Figure 22:
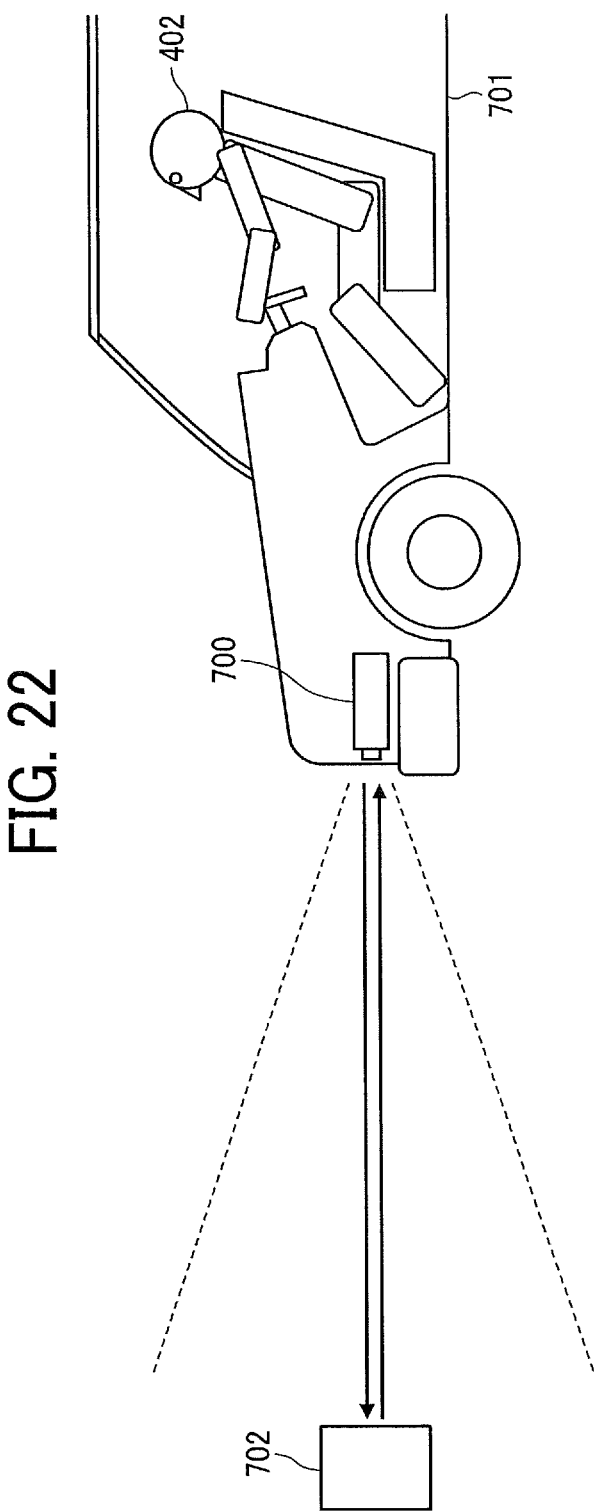
FIG. 22 is a schematic view of a motor vehicle mounted with a light detection and ranging (LiDAR) device.
Figure 23:
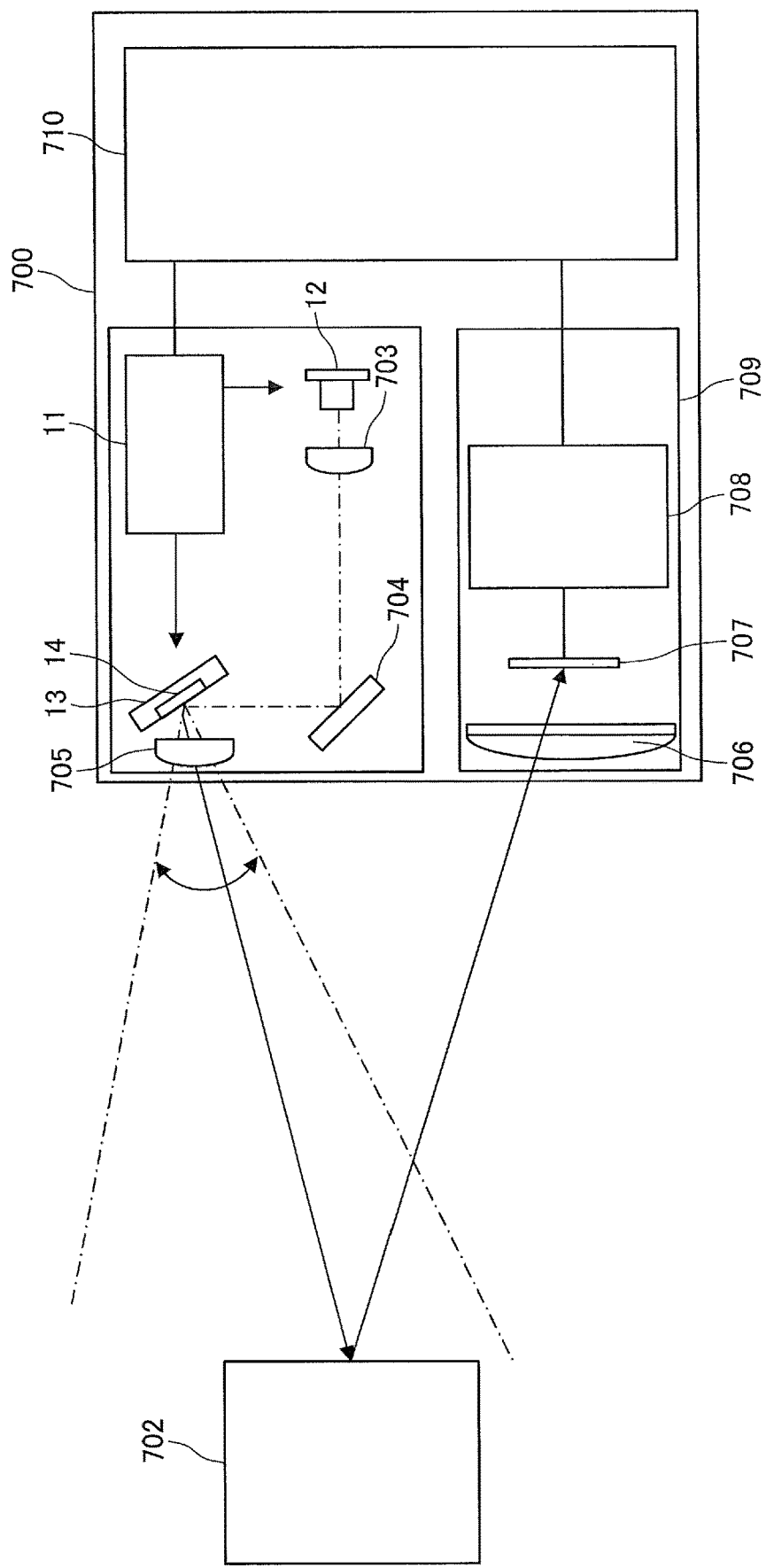
FIG. 23 is a schematic view of the LiDAR device according to an embodiment of the present disclosure.

Next, a distance measuring apparatus incorporating the movable device according to an embodiment is described in detail referring to FIGS. 22 and 23.

FIG. 22 is a schematic view of a vehicle mounted with a LiDAR device, which is an example of a distance measurement apparatus, in a lamp unit on which a headlamp of the vehicle is mounted. FIG. 23 is a schematic view of an example of the LiDAR device.

The distance measurement apparatus, which is, for example, a LiDAR device, measures a distance in a direction to the target object, or a target direction.

As illustrated in FIG. 22, for example, a LiDAR device 700 is mounted on a vehicle 701 to perform optical scanning in a target direction and receive the light reflected from an object 702 that exists in the target direction. Accordingly, the LiDAR device 700 measures a distance to the object 702. The vehicle 701 is an example of a mobile object.

As illustrated in FIG. 23, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing device 708. The signal processing device 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or absent to measure the distance from the obstacle.

In the present embodiment, the LiDAR device 700 is described as an example of the distance measuring device. However, no limitation is intended thereby. The distance measuring device may be any apparatus that performs optical scanning by controlling the movable device 13 provided with the reflecting surface 14, using the control device 11, and that receives the receives the reflected laser beam using a photodetector to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

As described above, the distance measurement apparatus incorporating the movable device 13 according to at least one embodiment achieves an increase in oscillation angle and enables optical scanning with a large scanning angle.

Figure 24:
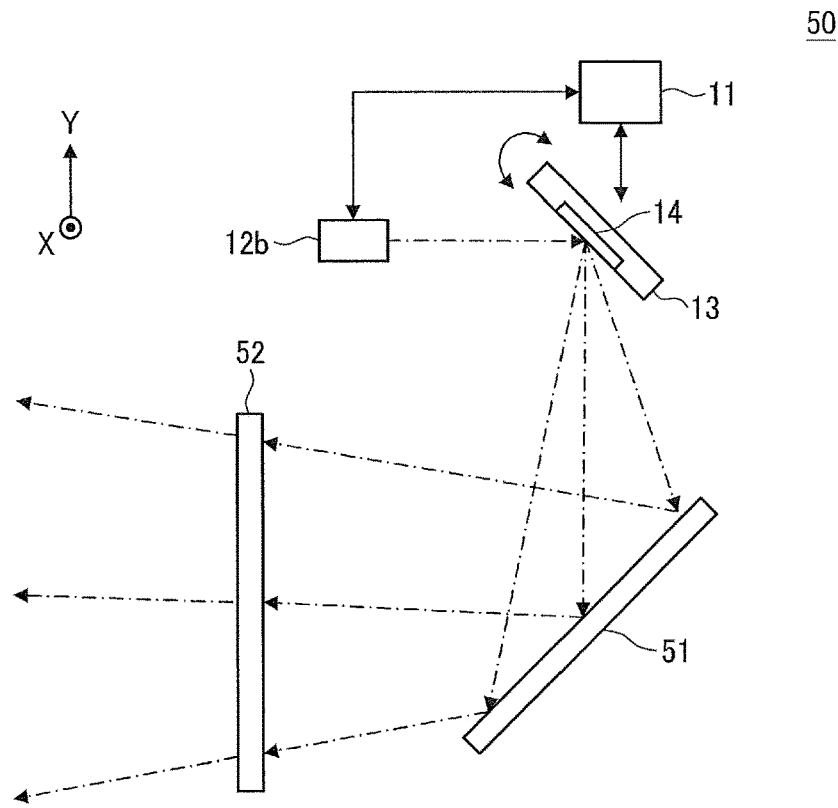
FIG. 24 is a schematic view of an example of a configuration of a laser headlamp.

Next, a laser headlamp 50 in which the movable device according to the present embodiment is applied to a headlight of a car is described with reference to FIG. 24. FIG. 24 is an illustration of the configuration of a laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits blue laser beams. The laser beams emitted from the light-source device 12b are incident on the movable device 13 and are reflected by the reflecting surface 14. The movable device 13 moves the reflecting surface 14 in the XY-direction in accordance with signals from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the automobile is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12b and the color of the phosphor are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

As described above, the laser headlamp incorporating the movable device 13 according to at least one embodiment achieves an increase in oscillation angle and enables optical scanning with a large scanning angle.

Figure 25:
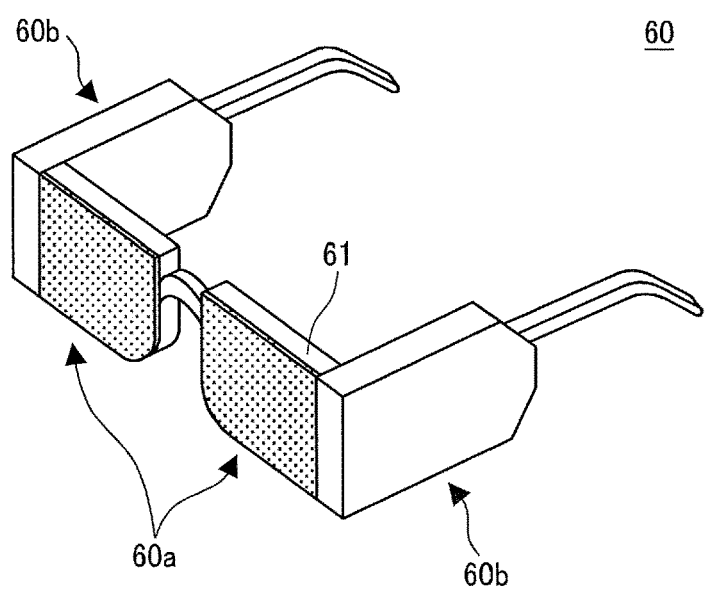
FIG. 25 is a perspective view of the external appearance of a head-mounted display (HMD) according to an embodiment of the present disclosure.
Figure 26:
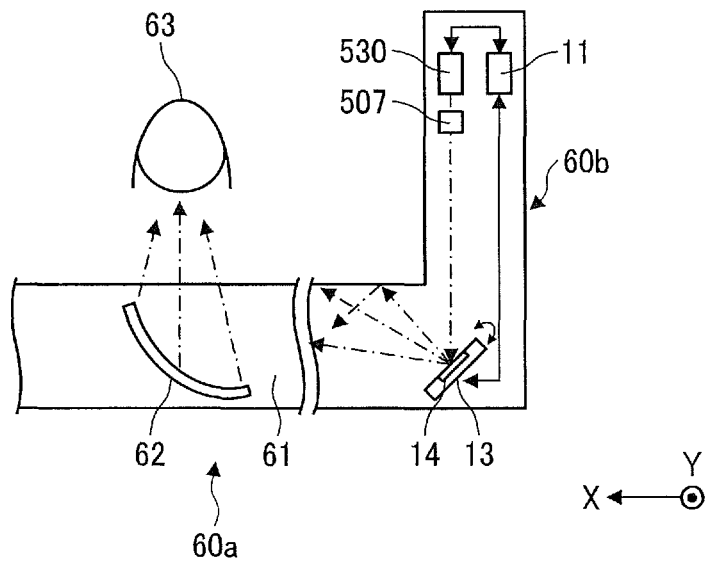
FIG. 26 is an illustration of a part of the configuration of the HMD in FIG. 18.

Next, a head-mounted display (HMD) 60 incorporating the movable device 13 according to an embodiment is described referring to FIGS. 25 and 26. Note that the HMD 60 is a head-mounted display that can be mounted on a human head, and can be shaped like, for example, glasses. In the following description, such a head-mounted display may be referred to simply as an HMD.

FIG. 25 is a perspective view of the appearance of the HMD 60. In FIG. 25, the HMD 60 includes a pair of front temples and a pair of temples, the pair of front temples and the pair of 60a temples being substantially symmetrical to each other on the right and left sides of the 60b. The front 60a can include, for example, a light guide plate 61. An optical system, a control device, and the like, can be incorporated in the temple 60b.

FIG. 26 is an illustration of a configuration of a part of the HMD 60. Although the configuration for the left eye is illustrated in FIG. 26, the HMD 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall and guides the scanning light to the semi-reflective mirror 62. The light guide plate 61 is formed by, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. The semi-reflective mirror 62 may be replaced with a mirror to exclude the extraneous light. In such a configuration, only the image that is formed by scanning light can be observed.

As described above, the HMD incorporating the movable device 13 according to at least one embodiment achieves an increase in oscillation angle and enables optical scanning with a large scanning angle.

Figure 27:
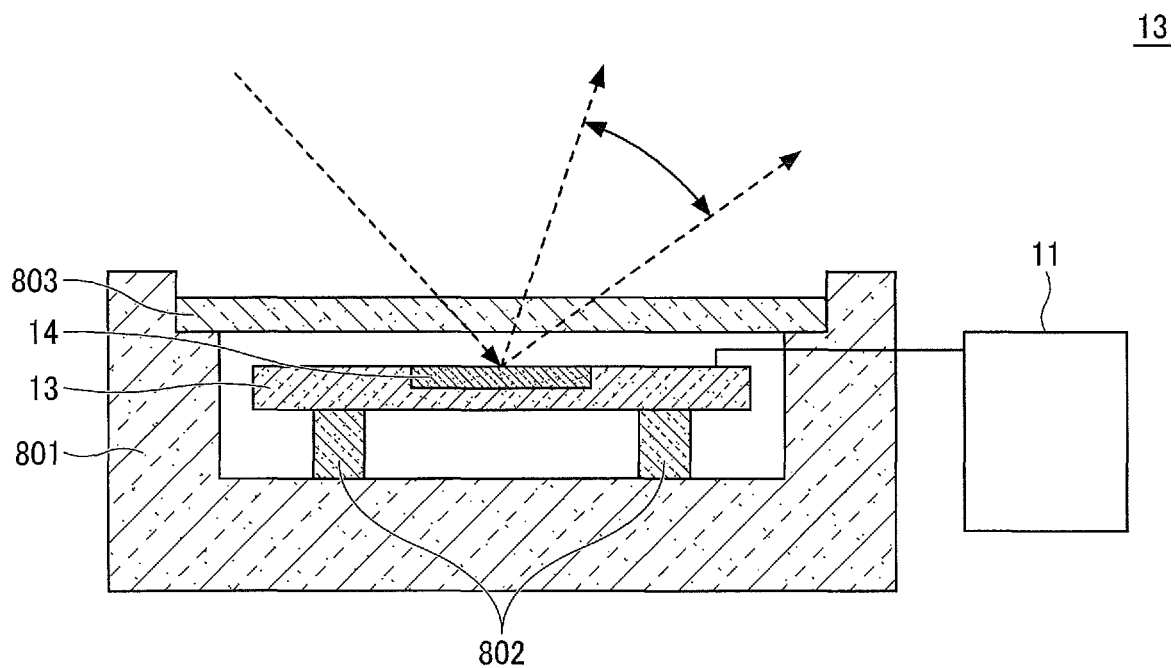
FIG. 27 is a schematic view of an example of a packaged movable device.

Next, packaging of the movable device 13 according to the embodiment is described referring to FIG. 27.

FIG. 27 is a schematic view of an example of a packaged movable device 13.

As illustrated in FIG. 27, the movable device 13 is mounted on a mounting component 802 inside the package 801, and is hermetically sealed and packaged as a part of the package 801 is covered with a light transmission member 803. The package contains inert gas such as nitrogen and is sealed. This configuration can substantially prevent the deterioration of the movable device 13 due to oxidation, and increase the durability against changes in environment such as temperature.

Although the embodiments of the present disclosure have been described above, the present disclosure is not limited to such specific embodiments, and various modifications and changes can be made without departing from the spirit and scope of the present disclosure as set forth in the appended claims.

In the above-described embodiments, the movable portion includes the reflecting surface. However, no limitation is intended thereby, and the movable portion may include another optical element such as a diffraction grating, or may include both the reflecting surface and another optical element.

In the above-described embodiments, the oscillator has a reflector. However, no limitation is intended thereby. The oscillator may include, for example, a diffraction grating, a photodiode, a heater (e.g., a heater using SiN), and a light source (e.g., a surface-emitting laser) 7 instead of the reflector.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An operating device comprising:
an oscillator oscillable around an oscillation axis;
a support; and
a movable portion including:
   a first connecting portion on one end, connected to the oscillator;
   a second connecting portion on another end, connected to the support; and
   a beam extending in an intersecting direction intersecting the oscillation axis;
at least one of the first connecting portion and the second connecting portion including:
a first extending portion extending along the oscillation axis; and
a first thick portion extending along the oscillation axis and having a thickness in a thickness direction greater than a thickness of another portion other than the first thick portion in the at least one of the first connecting portion and the second connecting portion, the thickness direction intersecting the oscillation axis and the intersecting direction, at least a part of the first thick portion included in the first extending portion,
wherein at least one of the first connecting portion and the second connecting portion includes:
an intersecting-direction extending portion extending from the beam in the intersecting direction; and
a third connecting portion extending along the oscillation axis and having a thickness in the thickness direction greater than a thickness of another portion other than the third connecting portion, at least a part of the third connecting portion included in the intersecting-direction extending portion.

2. The operating device according to claim 1,
wherein the beam includes multiple beams, and
wherein the movable portion further includes:
a coupling portion in which adjacent ends of the multiple beams are coupled to each other, to form a turning structure, the coupling portion including;
a second extending portion extending along the oscillation axis; and
a second thick portion extending along the oscillation axis and having a thickness in the thickness direction greater than a thickness of another portion other than the second thick portion in the coupling portion, a part of the second thick portion included in the second extending portion.

3. The operating device according to claim 1,
wherein each of the first connecting portion and the second connecting portion includes the first extending portion, the intersecting-direction extending portion, and the third connecting portion,
wherein the beam includes multiple beams, and
wherein the movable portion further includes:
a coupling portion in which adjacent ends of the multiple beams are coupled to each other, to form a turning structure, the coupling portion including:
a third thick portion extending along the oscillation axis and having a thickness in the thickness direction greater than a thickness of another portion other than the third thick portion in the coupling portion, a part of the third thick portion included in the third connecting portion.

4. The operating device according to claim 1,
wherein the support includes a first support frame portion extending along the oscillation axis, and
wherein the second connecting portion of the movable portion is connected to the support frame portion.

5. The operating device according to claim 1,
wherein the support includes a second support frame portion extending in the intersecting direction intersecting the oscillation axis, and
wherein the second connecting portion of the movable portion is connected to the second support frame portion.

6. The operating device according to claim 1,
wherein the first connecting portion includes the first thick portion,
wherein the oscillator includes an oscillator thick portion having a thickness in the thickness direction greater than a thickness of another portion other than the oscillator thick portion in the oscillator, and
wherein the first thick portion is connected to the oscillator thick portion.

7. The operating device according to claim 1,
wherein the second connecting portion includes the first thick portion, and
wherein the first thick portion is connected to the support.

8. A light deflector comprising the operating device according to claim 1,
wherein the oscillator includes a reflector.

9. A light deflecting device comprising:
a light source to emit light; and
the operating device according to claim 1 to deflect the light emitted by the light source.

10. A distance measurement apparatus comprising:
the light deflecting device according to claim 9 to emit light to an object;
a photosensor to receive light reflected from the object; and
circuitry to obtain output based on the received light from the photosensor and calculate a distance to the object based on the output.

11. An image projection apparatus comprising:
the light deflecting device according to claim 9 to deflect light emitted from the light source; and
an optical system to form an image with the light deflected by the light deflecting device, to be projected from the image projection apparatus.

12. A mobile object comprising the distance measurement apparatus according to claim 10.

13. A mobile object comprising the image projection apparatus according to claim 11.

* * * * *